(12) United States Patent
Sugino et al.

(10) Patent No.: US 9,997,291 B2
(45) Date of Patent: Jun. 12, 2018

(54) WIRELESS POWER SUPPLY APPARATUS, FILTER UNIT AND POWER SUPPLY APPARATUS FOR ROBOT USING THE FILTER UNIT

(71) Applicants: DENSO WAVE INCORPORATED, Chita-gun, Aichi-pref. (JP); DENSO CORPORATION, Kariya, Aichi-pref. (JP)

(72) Inventors: Masayoshi Sugino, Anjo (JP); Katsumi Yuasa, Nishio (JP); Keisuke Hamasaki, Nukata-gun (JP); Hiroshi Kondoh, Nagoya (JP); Shigeru Takeda, Okazaki (JP); Yasuyuki Haseo, Nishio (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 851 days.

(21) Appl. No.: 14/039,830

(22) Filed: Sep. 27, 2013

(65) Prior Publication Data

US 2014/0091635 A1 Apr. 3, 2014

(30) Foreign Application Priority Data

Sep. 28, 2012 (JP) .................. 2012-216194
Mar. 26, 2013 (JP) .................. 2013-064018

(51) Int. Cl.
*H01F 37/00* (2006.01)
*H01F 27/42* (2006.01)
(Continued)

(52) U.S. Cl.
CPC .............. *H01F 38/14* (2013.01); *H02J 5/005* (2013.01); *H02J 50/12* (2016.02); *H02J 50/50* (2016.02); *H02J 50/90* (2016.02)

(58) Field of Classification Search
CPC .................. H02F 38/14; H02J 5/005
(Continued)

(56) References Cited

U.S. PATENT DOCUMENTS 7,825,543 B2 11/2010 Karalis et al.
2011/0241440 A1 10/2011 Sakoda et al.
(Continued)

FOREIGN PATENT DOCUMENTS

CN 1167347 A 12/1997
CN 102640394 A 8/2012
(Continued)

OTHER PUBLICATIONS

May 5, 2015 Office Action issued in Chinese Patent Application No. 201310450144.2.

*Primary Examiner* — Rexford Barnie
*Assistant Examiner* — Toan Vu
(74) *Attorney, Agent, or Firm* — Oliff PLC

(57) ABSTRACT

A wireless power supply apparatus includes a power reception coil, an actual load and an auxiliary load. The power reception coil functions as a repeater for receiving electric power in a non-contact manner by magnetic resonance with a power transmission coil to which electric power is supplied from a power supply unit and relaying transfer of the electric power from the power transmission coil. The actual load is connected to the power reception coil and is powered by the electric power received by the power reception coil. The auxiliary load is inserted parallel to the power reception coil and the actual load and forms a closed circuit with the power reception coil when supply of the electric power to the actual load is interrupted to be in an open state.

5 Claims, 14 Drawing Sheets

(51) Int. Cl.
*H01F 38/00* (2006.01)
*H01F 38/14* (2006.01)
*H02J 50/90* (2016.01)
*H02J 50/50* (2016.01)
*H02J 50/12* (2016.01)
*H02J 5/00* (2016.01)

(58) Field of Classification Search
USPC .......................................................... 307/104
See application file for complete search history.

(56) References Cited

U.S. PATENT DOCUMENTS

| | | | | |
|---|---|---|---|---|
| 2011/0316334 | A1* | 12/2011 | Shimokawa | B60R 1/07 307/10.1 |
| 2012/0119697 | A1* | 5/2012 | Boys | B60L 11/182 320/108 |
| 2012/0139355 | A1* | 6/2012 | Ganem | H02J 5/005 307/104 |
| 2012/0318586 | A1 | 12/2012 | Atarashi | |
| 2013/0049481 | A1 | 2/2013 | Kudo et al. | |
| 2013/0057082 | A1 | 3/2013 | Takada et al. | |
| 2014/0306545 | A1* | 10/2014 | Robertson | H02J 5/005 307/104 |
| 2014/0368052 | A1* | 12/2014 | Norconk | H02M 3/3384 307/104 |

FOREIGN PATENT DOCUMENTS

| | | |
|---|---|---|
| JP | 2007-060829 A | 3/2007 |
| JP | A-2007-235798 | 9/2007 |
| JP | 2009-240098 A | 10/2009 |
| JP | 2010-154592 A | 7/2010 |
| JP | A-2011-244533 | 12/2011 |
| WO | 2011/034205 A1 | 3/2011 |

* cited by examiner

WIRELESS POWER SUPPLY APPARATUS, FILTER UNIT AND POWER SUPPLY APPARATUS FOR ROBOT USING THE FILTER UNIT

CROSS-REFERENCE TO RELATED APPLICATION

This application is based on and claims the benefit of priorities from earlier Japanese Patent Application Nos. 2012-216194 filed Sep. 28, 2012 and 2013-064018 filed Mar. 26, 2013, the descriptions of which are incorporated herein in their entirety by reference.

BACKGROUND

1. Technical Field

The present invention relates to a wireless power supply apparatus, a filter unit and a power supply apparatus for a robot using the filter unit.

2. Related Art

Recently, a wireless power supply using magnetic resonance is proposed. The wireless power supply realizes an electric power supply by generating magnetic resonance between a power transmission coil and a power reception coil (see U.S. Pat. No. 7,825,543). As is well known, such wireless power supply using magnetic resonance includes a repeater coil acting as a relay of power transfer. The repeater coil has a resonant frequency equivalent to that of the power reception coil and is inserted between the power transmission coil and the power reception coil. Use of the repeater coil can extend a power supply distance from the power transmission coil to the power reception coil.

However, in U.S. Pat. No. 7,825,543, coils of the magnetic resonance are configured by: a resonant coil corresponding to a power reception coil that creates a resonance phenomenon; and an exciting coil that transfers electric power. Therefore, the resonant coil performs an electric power transfer with a power transmission coil. The exciting coil performs an energy transfer by electromagnetic coupling with the resonant coil using a transformer or the like, such that electric power due to the energy transfer is used by a load.

When electric power is derived using such electromagnetic coupling, transmission efficiency between the resonant coil and the exciting coil for power conversion is as low as about 50%. There is a problem that, in order to obtain sufficient electric power the load connected to the resonant coil, the size of the power transmission coil and the resonant coil has to be increased.

In addition, since both of the resonant coil and the exciting coil for power conversion are essential, there is another problem of increasing the size of the configuration as a whole. In particular, recently, wireless power supply apparatuses are required to be set up in factory facilities and incorporated into industrial robots. The large size of the wireless power supply apparatuses is a serious impediment in introducing the apparatuses to facilities and robots.

On the other hand, machines including robots have been used in a wide range of facilities, such as factories. Such machines need electric power for activating the elements of the machines and signals for controlling the elements. Therefore, the facilities that use such machines are required to provide wiring for the electric power and wiring for the signals. On the other hand, in order to save labor involved in the establishment and maintenance of such facilities, the amount of wiring is required to be reduced as much as possible. As a measure against this, some suggestions are made, such as wireless transfer of electric power and signals (see JP-A-2011-244533) and superimposition of electric power and signals (see JP-A-2007-235798).

However, wireless transfer or superimposition of electric power and signals may raise a problem of causing communication errors and emission of noise. Such communication errors and emission of noise may lead to stoppage of the machines and lowering of operating rate due to the stoppage. To cope with this, it is necessary to use a filter unit which is able to accurately separate the superimposed electric power and signals of a plurality of channels. On the other hand, with the increase of the number of channels, the number of filters for separating signals will be increased. In addition, characteristics of the individual filters are required to be adjusted in conformity with the respective channels.

SUMMARY

It is thus desired to provide a wireless power supply apparatus without increasing the size of machines, while ensuring efficient transmission of electric power. It is further desired to provide a filter unit whose filter characteristics can be easily changed. Furthermore, it is desired to provide a power supply apparatus for a robot, which is able to steadily transfer control signals without emitting electromagnetic waves, under the conditions where electric power and signals are superimposed with each other and wirelessly transferred.

According to a first aspect of the present disclosure, there is provided a wireless power supply apparatus, including: a power reception coil that functions as a repeater for receiving electric power in a non-contact manner by magnetic resonance with a transmission coil to which electric power is supplied from a power supply unit and relaying transfer of the electric power from the power transmission coil; an actual load that is connected to the power reception coil and is powered by the electric power received by the power reception coil; and an auxiliary load that that is inserted parallel to the reception coil and the actual load and forms a closed circuit with the reception coil when supply of the electric power to the actual load is interrupted to be in an open state.

According to this configuration, the power reception coil, when provided at an end, for example, functions as a power reception coil of the end, and when inserted between the power transmission coil and an end coil, functions as a repeater. The power reception coil is directly connected to the actual load. In other words, the actual load is directly powered by the electric power received by the power reception coil. Accordingly, it is not necessary to provide a converting means, such as a transformer, for converting electric power between the power reception coil and the actual load. Thus, the size of the power reception coil will not be increased.

Further, since no power converting means is required, energy decay is minimize, which would be caused in converting electric power, and electric power is ensured to be efficiently transferred. In addition, the efficient power transfer contributes to reducing the electric capacity of a power supply unit and a power transmission coil on a power-transmission side as well. Reduction of the electric capacity accelerates reduction of the size and facilitates introduction of the apparatus into robots and factory facilities.

When the power reception coil and the actual load are directly connected, a closed circuit, i.e. a closed loop, is not necessarily constantly formed between the power reception coil and the actual load. For example, when the power source of the actual load is turned off, i.e. when the actual load is not powered, the circuit connecting between the power reception coil and the actual load is open at some point of the circuit and supply of electric power is interrupted.

When the power reception coil is permitted to function as a repeater, a closed loop is required to be formed centering on the power reception coil. However, when the power reception coil and the actual load are directly connected as mentioned above, the function of the power reception coil as a repeater may be impaired, depending on the activation conditions of the actual load.

In the above configuration, the auxiliary load is inserted parallel to the power reception coil and the actual load. If the circuit between the power reception coil and the actual load is open, the power reception coil forms a closed loop with the auxiliary load. Therefore, the function of the power reception coil as a repeater is steadily ensured, irrespective of the activation conditions of the actual load. Accordingly, in the case of directly connecting the power reception coil and the actual load as well, the power transfer distance can be extended and steady power supply is ensured.

Further, in the above configuration, the power reception coil, when the actual load connected thereto is powered, forms a closed electric circuit with the actual load, and when the actual load is not powered, forms a closed electric circuit with the auxiliary load. Accordingly, the power reception coil, whichever of an end coil and a relay coil it may serve as, constantly receives electric power from the power transmission coil.

The direct connection between the power reception coil and the actual load dispenses with power conversion and reduces energy decay that would accompany the power conversion. Accordingly, power transfer is efficiently performed, and the size of the machines including the power transmission coil and the power reception coil is reduced compared to the wireless power supply apparatus based on the conventional art.

The wireless power supply apparatus may further include: an actual load acquiring unit that acquires load of the actual load; and a load changing unit that changes load of the auxiliary load in accordance with the load of the auxiliary load acquired by the actual load acquiring unit.

According to this configuration, the actual load acquiring unit acquires the load of the actual load. In other words, the actual load acquiring unit constantly monitors the loaded state of the actual load. Then, the load changing unit changes the load of the auxiliary load, in accordance with the load of the actual load that has been acquired by the actual load acquiring unit.

For example, the auxiliary load is a variable load. When power is supplied using magnetic resonance, power supply efficiency between the power transmission coil and the power reception coil that includes a repeater varies according to the loaded state of the actual load. It is favorable that the sum of the loads of the actual load and the auxiliary load is maintained to a value that ensures high power supply efficiency.

Thus, the load changing unit changes the load of the auxiliary load, i.e. the variable load, according to the loaded state of the actual load, so that the sum of the loads of the actual load and the auxiliary load is maintained to a fixed value. Accordingly, under the conditions where the load of the actual load connected to the power reception coil varies, power supply efficiency and steadiness in the power transmission can be enhanced.

According to a second aspect of the present disclosure, there is provided a filter unit, including: a first coil segment that is provided on a power supply side; and a second coil segment that is provided at a position on a power consumption side apart by a predetermined distance in a non-contact manner from the first coil segment and is opposed to the first coil segment, such that magnetic resonance occurs between the first and second coil segments. The first and second coil segments allow passage of electric power having a specific frequency due to the magnetic resonance occurring between the first and second coil segments.

According to this configuration, the first coil segment on the power-supply side and the second coil segment on the load side are opposed to each other in a non-contact manner. Magnetic resonance occurs between the first and second coil segments. Application of a predetermined high-frequency wave to the first coil segment causes magnetic resonance which reduces the impedance of the second coil segment. Accordingly, high-frequency electric power is transferred from the first coil segment to the second coil segment in a non-contact manner.

Magnetic resonance occurs between the pair of the first and second coil segments in a common specific frequency band, i.e. in a bandwidth of the two resonant frequencies generated by the magnetic resonance. Therefore, use of the magnetic resonance occurring between the first and second coil segments can allow passage of electric power of only a specific frequency band. In other words, the first and second coil segments that use magnetic resonance function as a filter.

Further, use of magnetic resonance can prevent emission of electromagnetic waves that would induce noise. The bandwidth of the high-frequency wave transferred from the first coil segment to the second coil segment varies, depending on the distance between the first and second coil segments and the resonant frequencies generated therebetween.

Accordingly, the distance between the first coil segment and the second coil segment can be changed by only changing a separation distance between the first and second coil segments. In addition, the resonant frequencies of the magnetic resonance can be changed by only changing the number of turns of the first and second coil segments or the capacity of a capacitor of the first and second coil segments. Thus, the bandwidth of the frequencies of the signals transferred from the first coil segment to the second coil segment can be easily changed. Accordingly, characteristics of the filter can be easily adjusted without causing emission of electromagnetic waves.

Specifically, in the above configuration, the first and second coil segments are used to make use of the magnetic resonance occurring therebetween. Use of magnetic resonance can facilitate the change in the distance between the coil segments, the number of turns of the coil segments, the capacity of the capacitor of the coil segments, and the like. Accordingly, the frequency of the electric power permitted to pass through the filter that uses magnetic resonance can be easily changed by changing the distance between the coil segments, the number of turns of the coil segments, the capacity of the capacitor, and the like. Thus, characteristics of the filter can be easily adjusted.

According to a third aspect of the present disclosure, there is provided a power supply apparatus for a robot, including: a power transmission coil unit that is connected to a power source which supplies electric power having a specific frequency; a power reception coil unit that is connected to a load powered by electric power having a specific frequency and is opposed to the power transmission coil unit to receive electric power from the power transmission coil in a non-contact manner by using magnetic resonance occurring between the power transmission coil unit and the power reception coil unit; and a filter unit that is provided in a power transfer path between the power source and the power transmission coil and between the power reception coil and the load.

The filter unit allows passage of electric power having a specific frequency and includes: a first coil segment that is provided on a power supply side; a second coil segment that is provided at a position on a power consumption side apart by a predetermined distance in a non-contact manner from the first coil segment and is opposed to the first coil segment, such that magnetic resonance occurs between the first and second coil segments. The first and second coil segments allow passage of electric power having a specific frequency due to the magnetic resonance occurring between the first and second coil segments, such that a control signal for driving the load is separated.

According to this configuration, the filter unit described above is provided. In the power supply apparatus for the robot, electric power is transferred from the power transmission coil unit to the power reception coil unit by use of magnetic resonance. Therefore, emission of electromagnetic waves that would induce noises is reduced between the power transmission coil unit and the power reception coil unit.

The power transmission coil unit and the power reception coil unit have power transfer paths each of which is provided with the filter as described above. Therefore, on the power reception coil unit side, high-frequency waves composed of a plurality of frequencies are separated by the filter unit. On the other hand, on the power transmission coil unit side, the filter unit can reduce interference between the high-frequency waves composed of a plurality of frequencies. Accordingly, when the power transmission coil unit and the power reception coil unit are wirelessly connected, emission of electromagnetic waves can be reduced and control signals can be steadily transferred.

DESCRIPTION OF EMBODIMENTS

Figure 1:
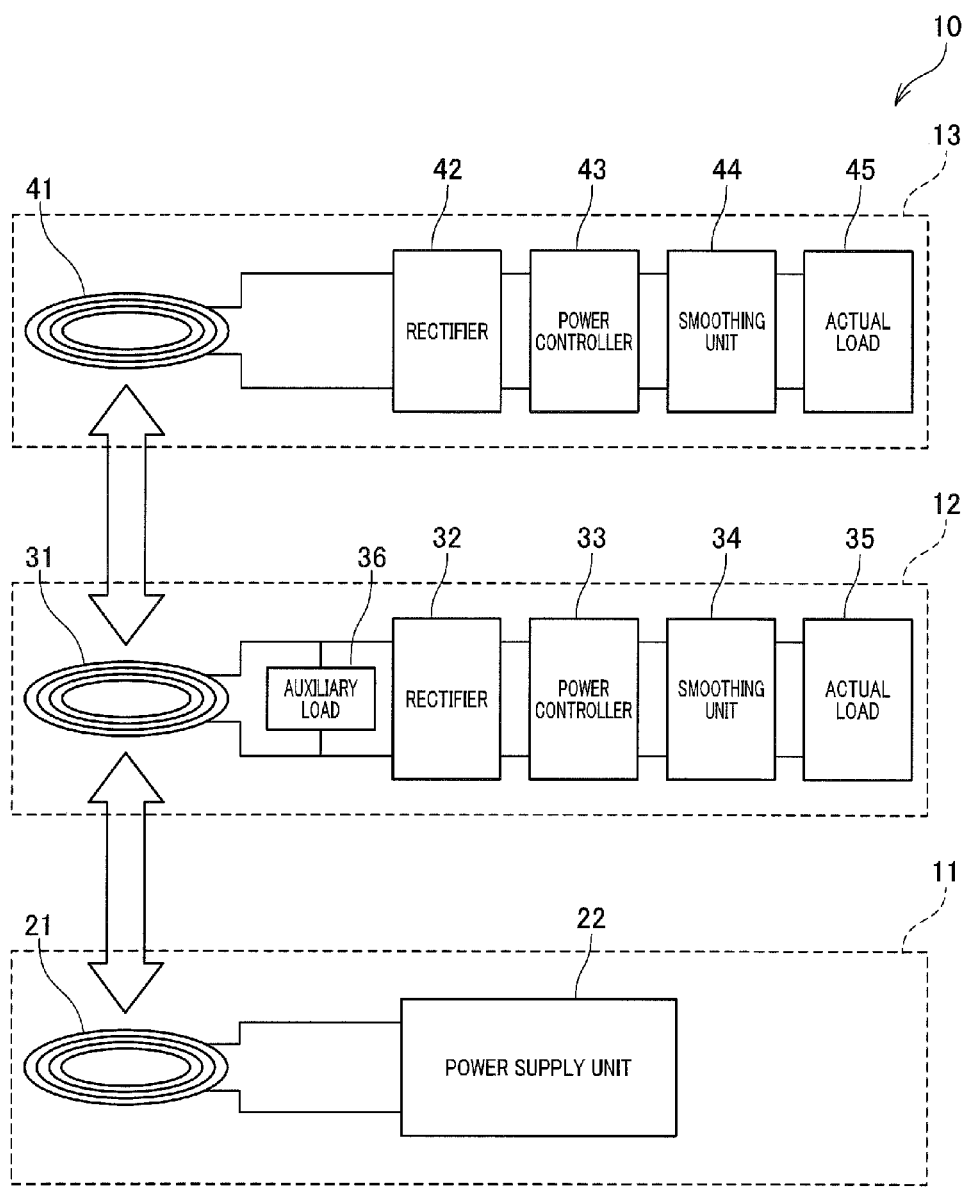
FIG. 1 is a schematic block diagram showing a wireless power supply apparatus, according to a first embodiment of the present invention.

With reference to the accompanying drawings, hereinafter are described several embodiments of a wireless power supply of the present invention. In the following embodiments, the components identical with or similar to each other are given the same reference numerals for the sake of omitting unnecessary explanation.

First Embodiment

As shown in FIG. 1, a wireless power supply apparatus 10 according to a first embodiment includes a power transmission module 11, an intermediate module 12 and an end module 13. In the first embodiment, the wireless power supply apparatus 10 is set up in a facility, such as a factory, to wirelessly supply electric power from the power transmission module 11 to the intermediate module 12 and the end module 13. In applying the wireless power supply apparatus 10 to a facility, such as a factory, electric power is wirelessly supplied from the power transmission module 11 to the intermediate module 12 and the end module 13.

Figure 2:
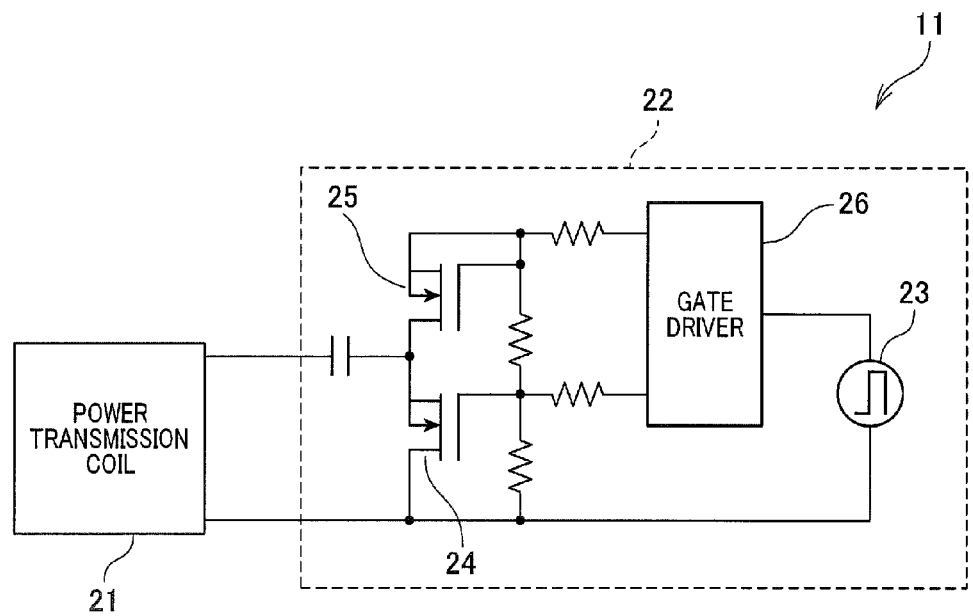
FIG. 2 is a schematic diagram showing a power transmission module in the wireless power supply apparatus, according to the first embodiment.

The power transmission module 11 includes a power transmission coil 21 and a power supply unit 22. As shown in FIG. 2, the power supply unit 22 is configured by an electric circuit that includes a power source 23 of alternating current, switching elements 24 and 25 and a gate driver 26. The switching elements 24 and 25 are configured such as by field effect transistors (FETs). With this configuration, the power supply unit 22 supplies a high-frequency wave ranging from several MHz to several tens of MHz to the power transmission coil 21. For example, the power transmission coil 21 includes a planar coil in which a coil is formed on the surface of a planar base, not shown.

As shown in FIG. 1, the intermediate module 12 includes a power transmission coil 31, a rectifier 32, a power controller 33, a smoothing unit 34, an actual load 35 and an auxiliary load 36. Similar to the power transmission coil 21, the power reception coil 31 includes a planar coil in which a coil is formed on the surface of a planar base, not shown. The power reception coil 31 receives electric power from the power transmission coil 21 without being in contact therewith, using magnetic resonance that occurs therebetween. When the high-frequency wave is supplied to the power transmission coil 21, magnetic resonance occurs between the power transmission coil 21 and the power reception coil 31 to perform power transfer therebetween. The power reception coil 31 of the intermediate module 12 receives electric power outputted from the power transmission coil 21.

Figure 3:
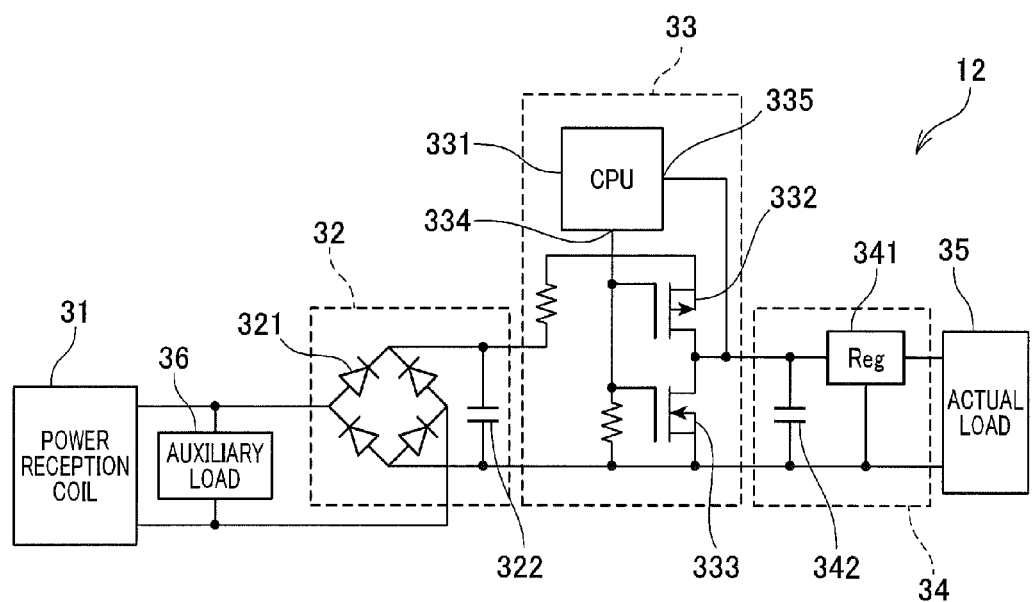
FIG. 3 is a schematic diagram showing an intermediate module in the wireless power supply apparatus, according to the first embodiment.

The rectifier 32 is a so-called AC/DC (alternating-current to direct-current) converter. For example, as shown in FIG. 3, the rectifier 32 includes a diode bridge 321 and a capacitor 322. The rectifier 32 rectifies the electric power received by the power reception coil 31 from alternating current of high-frequency to direct current.

For example, the power controller 33 includes a central processing unit (CPU) 331 and switching elements 332 and 333, such as FETs, to control output of the electric power, which has been rectified by the rectifier 32, toward the actual load 35. The CPU 331 has an output terminal 334 for outputting pulse width modulation (PWM) signals that has been subjected to PWM. The switching elements 332 and 333 are driven by the PWM signals outputted from the CPU 331. Thus, the power controller 33 controls the electric power outputted to the actual load 35.

The amount of power supplied to the actual load 35 is changed according to the duty ratio of the PWM signals outputted from the CPU 331. The CPU 331 incorporates an ADC (analog to digital converter) and has an ADC input terminal 335 which is connected to the output side of the switching elements 332 and 333. The CPU 331 acquires, via the ADC input terminal 335, a voltage ADin that corresponds to a voltage inputted from the rectifier 32. Based on the voltage ADin acquired via the ADC input terminal 335, the CPU 331 calculates a PWM duty ratio for performing PWM and outputs signals having a pulse width in conformity with the calculated PWM duty ratio. The smoothing unit 34 includes a resistor 341 and a capacitor 342 to smooth the signals and electric power outputted from the power controller 33.

The end module 13 includes a power reception coil 41, a rectifier 42, a power a controller 43, a smoothing unit 44 and an actual load 45. The power reception coil 41, a rectifier 42, a power controller 43 and a smoothing unit 44 configuring the end module 13 have the same configurations as those of the corresponding components of the intermediate module 12. Therefore, description is omitted. Thus, the end module 13 is different from the intermediate module 12 in that the end module 13 does not include the auxiliary load 36.

The power reception coil 41 of the end module 13 receives electric power, in a non-contact manner, from the power transmission coil 21 via the reception coil 31 of the intermediate module 12. In other words, the electric power supplied from the power transmission coil 21 of the power transmission module 11 is transferred to the end module 13, being relayed by the reception coil 31 of the intermediate module 12. In this case, the intermediate module 12 allows either the actual load 35 or the auxiliary load 36 to consume a part of the electric power transferred from the power transmission coil 21.

Thus, the electric power from the power transmission coil 21 is transferred to the end module 13, using the intermediate module 12 as a relay of power transfer. A part of the electric power outputted from the transmission coil 21 is consumed in the intermediate module 12 and the rest of the electric power is consumed in the end module 13. The power reception coil 31 of the intermediate module 12 has a function of not only receiving electric power from the power transmission coil 21 but also relaying the electric power to the power reception coil 41 of the end module 13. That is, the power transmission coil 31 of the intermediate module 12 also functions as a relay coil, i.e. a repeater.

The actual loads 35 and 45 of the intermediate and end modules 12 and 13, respectively, are functional components that exert various functions. For example, these functional components include components and elements, such as a motor, an actuator and a heater, that convert electric energy into mechanical energy or thermal energy. For example, the functional components may be a component, such as a camera, that records images or a component that records sound. Thus, the actual loads 35 and 45 of the intermediate and end modules 12 and 13, respectively, are powered by the electric power received by the power reception coil 31 or 41.

Hereinafter, the intermediate module 12 is more specifically described.

The intermediate module 12 includes the auxiliary load 36 as well as the actual load 35. The auxiliary load 36 is inserted between the power reception coil 31 and the actual load 35 so as to be parallel to the actual load 35. Transmission of electric power to the actual load 35 of the intermediate module 12 is connected or disconnected by activating or deactivating the actual load 35.

When transmission of electric power to the actual load 35 is stopped, the power reception coil 31 and the actual load 35 are in an open state where the electric circuit therebetween is interrupted. As mentioned above the auxiliary load 36 is inserted parallel to the actual load 35. Accordingly, when the actual load 35 of the intermediate module 12 is deactivated and the electric circuit of the intermediate module 12 is in an open state, a closed circuit is formed between the auxiliary load 36 and the power reception coil 31. Thus, the electric power received by the power reception coil 31 flows through the closed circuit that is formed by way of the auxiliary load 36.

When the intermediate module 12 is inserted between the power transmission module 11 and the end module 13 as in the present first embodiment, the electric power outputted from the power transmission module 11 is transferred to the end module 13 with the intermediate module 12 being used as a relay of power transfer. Thus, the insertion of the intermediate module 12 can extend the power transfer distance between the power transmission module 11 and the end module 13. Specifically, the insertion of the intermediate module 12 as a relay of power transfer between the power transmission module 11 and the end module 13 can extend the power transmission distance between the power transmission module 11 and the end module 13.

On the other hand, in the intermediate module 12 serving as a relay of power transfer, no current passes through the power reception coil 31 in a state where a closed circuit including the power reception coil 31 is not formed in the intermediate module 12. Accordingly, in this state, the intermediate module 12 is not able to relay electric power as a repeater. For example, when the actual load 35 is not directly connected to the intermediate module 12, a simple closed circuit is formed including the power reception coil 31. Thus, the power reception coil 31 of the intermediate module 12 is permitted to function as a repeater.

However, in the first embodiment, the actual load 35 is directly connected to the intermediate module 12 and a part of the electric power received by the power reception coil 31 is used by the actual load 35. In this situation, when the actual load 35 is deactivated, i.e. when the actual load 35 is turned off, the electric circuit including the power reception coil 31 of the intermediate module 12 will be an open circuit. Thus, when the actual load 35 is turned off, current does not pass through the power reception coil 31 of the intermediate coil 12. As a result, the power reception coil 31 is not permitted to function as a repeater.

In this regard, in the first embodiment, the intermediate module 12 includes the auxiliary load 36 which is parallelly inserted between the power reception coil 31 and the actual load 35. Owing to the parallel insertion of the auxiliary load 36, the power reception coil 31 and the auxiliary load 36 can form a closed circuit when the actual load 35 is deactivated. Accordingly, the power reception coil 31 of the intermediate module 12 can function as a repeater to relay transmission of the electric power from the power transmission module 11 to the end module 13.

As a result, when the actual load 35 is directly connected to the intermediate module 12, the power transfer distance between the power transmission module 11 and the end module 13 can be extended, irrespective of the activation conditions of the actual load 35. In the present embodiment, the auxiliary load 36 is configured such as by an inductor.

Hereinafter is described the operation of the wireless power supply apparatus 10 configured as described above.

Figure 4:
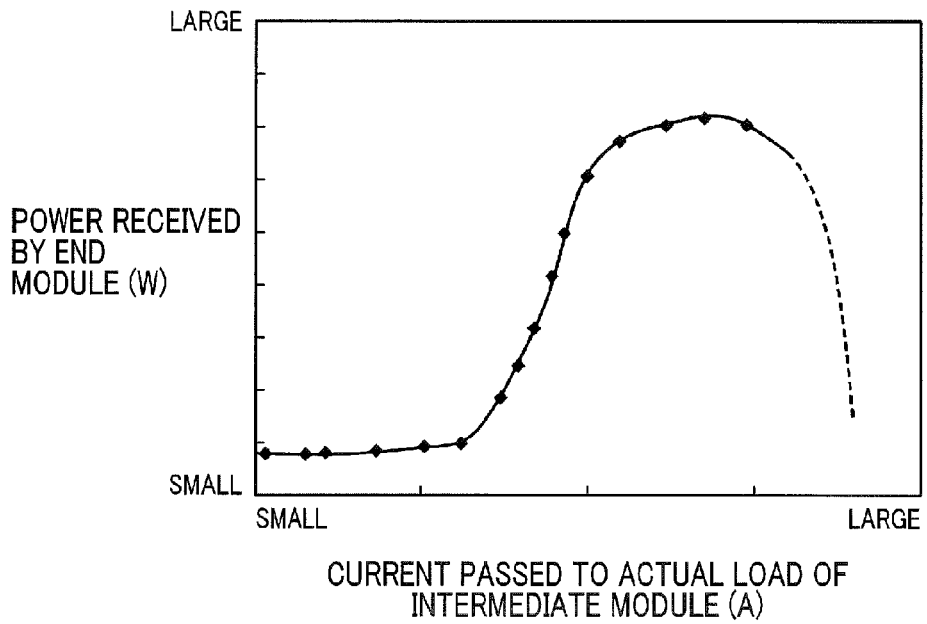
FIG. 4 is a schematic diagram showing a relationship between current that is passed to an actual load of the intermediate module and electric power received by an end module.

FIG. 4 shows electric power consumed by the intermediate module 12, i.e. current [A] passing through the actual load 35, relative to electric power [W] received by the end module 13.

As shown in FIG. 4, when the electric power consumed by the actual load 35 of the intermediate module 12 is small, the electric power received by the end module 13 is small. This is because, when the electric power consumed by the actual load 35 of the intermediate module 12 is small, the current passing through the intermediate module 12 is reduced and the current passing through the electric circuit including the power reception coil 31 is also reduced to thereby lower the function as a repeater.

Thus, reduction of the current passing through the power reception coil 31 weakens the magnetic field generated in the power reception coil 31. Therefore, the power transfer due to magnetic resonance is no longer established between the power transmission module 11 and the end module 13 via the intermediate module 12 serving as a relay of power transfer.

On the other hand, when the electric power consumed by the actual load 35 of the intermediate module 12 is large, the electric power received by the end module 13 is large. This is because, contrary to the case where the electric power consumed by the actual load 35 of the intermediate module 12 is small, the increase of the electric power consumed by the actual load 35 of the intermediate module 12 increases the current passing through the intermediate module 12 to thereby also increase the current passing through the electric circuit including the power reception coil 31.

Thus, as the current passing through the power reception coil 31 is increased, the magnetic field generated in the power reception coil 31 is intensified. Accordingly, power supply is achieved between the power transmission module 11 and the end module 13 via the intermediate module 12 serving as a relay of power transfer. In other words, the power reception coil 31 of the intermediate module 12 functions as a repeater.

Further, when the electric power consumed by the actual load 35 of the intermediate module 12 is excessively large, the electric power received by the end module 13 is reduced. This is because, when the electric power consumed by the actual load 35 of the intermediate module 12 is excessively large, a greater part of the electric power outputted from the power transmission module 11 is consumed by the actual load 35 of the intermediate module 12.

Thus, consumption of a greater part of the electric power outputted from the power transmission module 11 by the actual load 35 of the intermediate module 12 reduces the electric power that can be supplied from the power transmission module 11 to the end module 13 via the intermediate module 12 serving as a relay of power transfer. As a result, the electric power received by the end module 13 is reduced.

Thus, in order to permit the power reception coil 31 of the intermediate module 12 to function as a repeater, the intermediate module 12 is required to consume a given amount of electric power. On the other hand, the actual load 35, when its function is deactivated, stops consumption of electric power.

In this regard, in the first embodiment, the auxiliary load 36 is inserted parallel to the actual load 35. Thus, when the actual load 35 is deactivated and its consumption of electric power is stopped, the auxiliary load 36 is ensured to consume electric power. In other words, deactivation of the actual load 35 allows current to flow through the auxiliary load 35. In this case, the current flowing through the auxiliary load 36 is set to a level which is sufficient for permitting the power reception coil 31 of the intermediate module 12 to function as a repeater. As a result, the power reception coil 31 of the intermediate module 12 functions as a repeater, irrespective of the activation conditions of the actual load 35.

Figure 5:
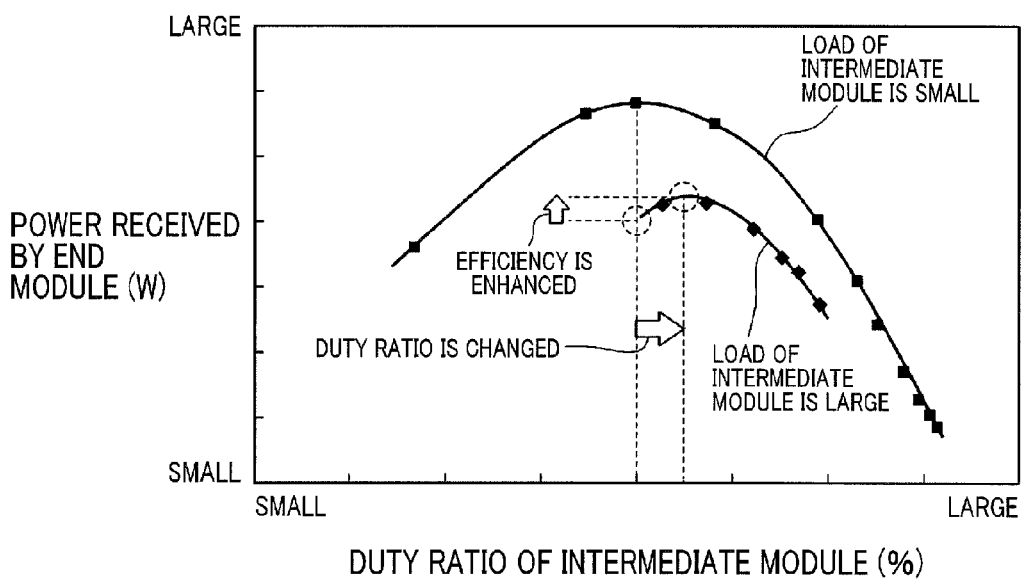
FIG. 5 is a schematic diagram showing a relationship between duty ratio of the intermediate module and electric power received by the end module.

FIG. 5 shows PWM duty ratio [%] controlled by the power controller 43 of the end module 13, relative to electric power [W] received by the end module 13. Specifically, FIG. 5 shows how the relationship between PWM duty ration in the end module 13 and received electric power is changed by the load in the intermediate module 12.

As shown in FIG. 5, the PWM duty ratio that maximizes the electric power that can be received by the end module 13 depends on the magnitude of the load in the intermediate module 12. Therefore, fixing the PWM duty ratio on the assumption that the intermediate module 12 has a small load will disable use of the PWM duty ratio that exerts the highest power transfer efficiency when the actual load of the intermediate module 12 is increased.

In the first embodiment, the PWM duty ratio outputted by the power controller 43 of the end module 13 is changed, thereby changing the electric power that can be received by the end module 13 depending on the loaded state of the intermediate module 12. Accordingly, the PWM duty ratio in the end module 13 is constantly controlled to be an optimal value.

For example, as shown in FIG. 5, when the load of the intermediate module 12 is increased, the power controller 43 of the end module 13 changes the duty ratio to a high side. Thus, the electric power that can be received by the end module 13 is increased to thereby enhance the power transfer efficiency.

Figure 6:
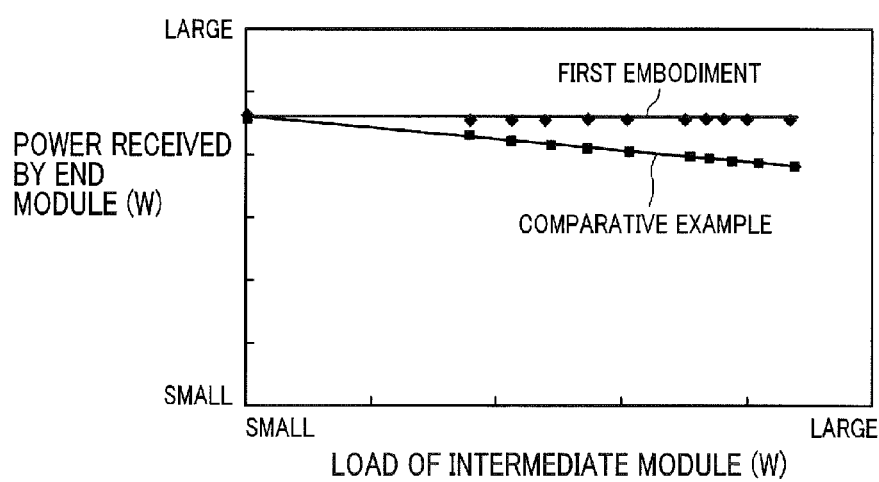
FIG. 6 is a schematic diagram showing a relationship between load of the intermediate module and electric power received by the end module.

FIG. 6 shows load of the actual load 35 of the intermediate module 12, i.e. power consumption [W] of the actual load 35, relative to electric power [W] that can be received by the end module 13.

In the first embodiment, as described referring to FIG. 5, the PWM duty ratio is controlled by the power controller 43 of the end module 13, so that the electric power that can be received by the end module 13 exhibits only a small change, irrespective of the load of the intermediate module 12.

On the other hand, in a comparative example in which the PWM duty ratio is not controlled by the power controller 43 of the end module 13, the electric power that can be received by the end module 13 varies with the variation of the load of the intermediate module 12. Specifically, in the comparative example, the increase of the load of the intermediate module 12 decreases the electric power that can be received by the end module 13.

As can be understood from this, by changing the PWM duty ratio in the end module 13 according to the loaded state of the actual load 35 of the intermediate module 12, as in the first embodiment, the end module 13 can steadily receive electric power. Accordingly, in the first embodiment, under the condition where the actual load 35 is connected to the intermediate module 12, the electric power outputted from the transmission module 11 can be effectively used by the end module 13.

Hereinafter is described a flow of the operation of the power controller 33 of the intermediate module 12 which is configured as described above.

The intermediate module 12 functions either in an active mode or a sleep mode. The active mode corresponds to a state where the power reception coil 31 is functioning as a repeater. The sleep mode corresponds to a state where, for example, the intermediate module 12 deviates from the position of relaying between the power transmission module 11 and the end module 13, and the power reception coil 31 of the intermediate module 12 is not functioning as a repeater.

The power controller 33 switches the function of the intermediate module 12 between an active mode and a sleep mode, depending on the state of the power reception coil 31.

Figure 7:
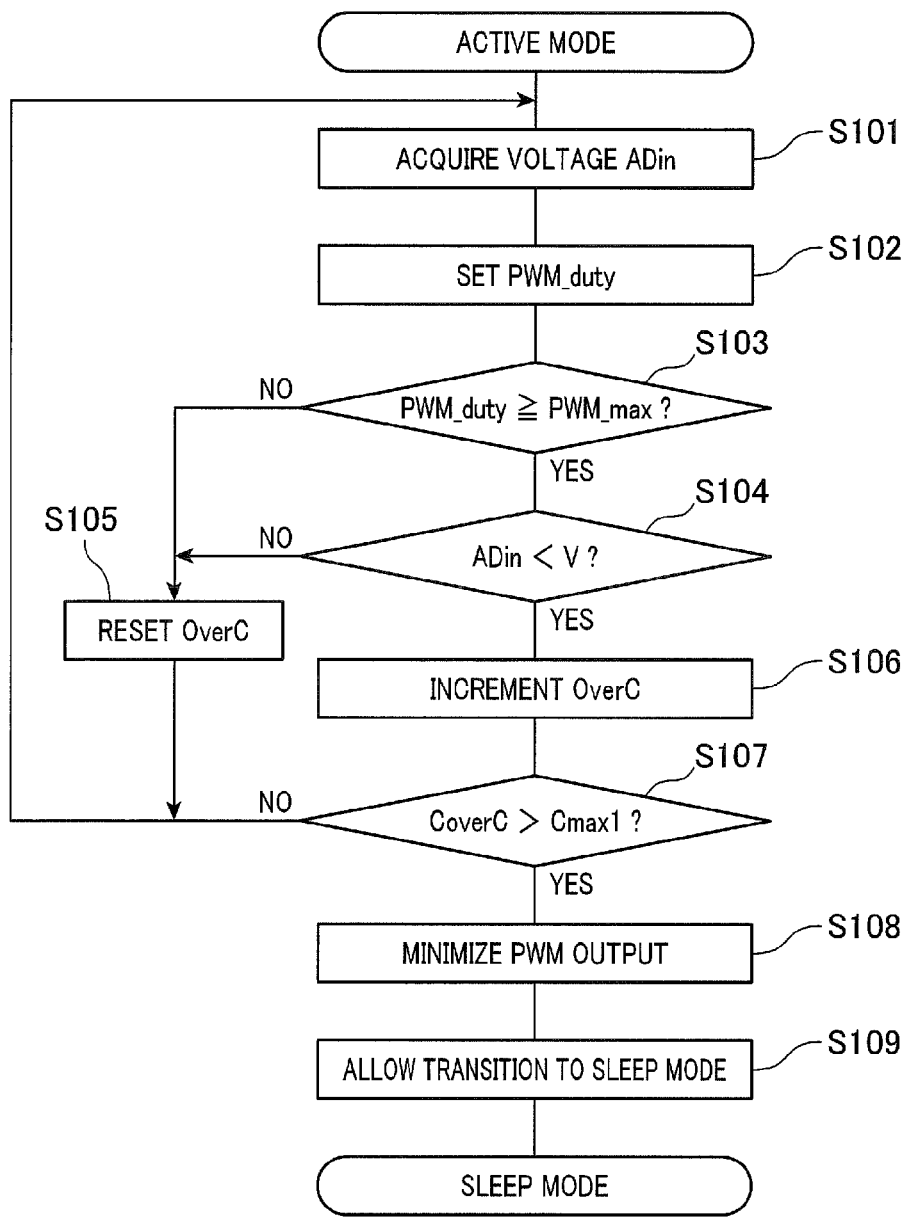
FIG. 7 is a schematic diagram showing a flow of transition from an active mode to a sleep mode in the wireless power supply apparatus, according to the first embodiment.

As shown in FIG. 7, when the intermediate module 12 is in an active mode, the CPU 331 acquires the voltage ADin inputted to the AD input terminal 335 (step S101). The voltage ADin here is inputted from the AD input terminal 335, AD-converted by the incorporated ADC and detected. The voltage ADin corresponds to the voltage inputted from the rectifier 32. The CPU 331 subjects the voltage ADin acquired at step S101 to a PID (proportional integral derivative) process to thereby set a duty ratio PWM_duty based on the measured voltage ADin, for use in PWM (step S102).

In other words, the CPU 331 sets the duty ratio PWM_duty so that the voltage ADin will be a target output value which is outputted to the actual load 35. At step S102, although the CPU 331 performs the PID process, as an example, the CPU 331 may perform a different process.

After setting the duty ratio PWM_duty at step S102, the CPU 331 determines whether or not the set duty ratio PWM_duty is not less than a preset maximum value PWM_max (step S103). The maximum value PWM_max is set in advance to about 80% of duty ratio. The maximum value PWM_max can be optionally set according to the magnitude of the actual load 35.

When the current passed to the actual load 35 is decreased and the voltage ADin is decreased, the CPU 331 increases the duty ratio PWM_duty to maintain the current passed to the actual load 35. On the other hand, when the current passed to the actual load 35 is excessively reduced, the duty ratio PWM_duty becomes equal to or more than the maximum value PWM_max.

If the duty ratio PWM_duty set at step S102 is determined to be not less than the maximum value PWM_max (Yes at step S103), the CPU 331 then determines whether or not the voltage ADin is smaller than a threshold voltage V (step S104). The threshold voltage V is the lower limit of the voltage applied to the actual load 35.

If the duty ratio PWM_duty is determined, at step S103, to be not more than the maximum value PWM_max (No at step S103), the CPU 331 determines that the current passed to the actual load 35 is appropriate. Accordingly, the CPU 331 resets a count OverC of a shutdown counter preset in the CPU 331 (step S105).

Further, if the CPU 331 determines, at step S104, that the voltage ADin is not less than the threshold voltage V (No at step S104), control proceeds to step S105 where the count OverC of the shutdown counter is reset. In other words, if the voltage ADin is determined to be not less than the threshold voltage V, the CPU 331 determines that electric power can be supplied to the actual load 35.

After resetting the count OverC of the shutdown counter at step S105, the CPU 331 returns control to step S101 to continue the process. The shutdown counter measures the period for determining whether to permit the intermediate module 12 to transition from an active mode to a sleep mode.

If the voltage ADin is determined, at step S104, to be smaller than the threshold voltage V (Yes at step S104), the CPU 331 increments the count OverC of the shutdown counter (step S106). Specifically, if the voltage ADin is smaller than the threshold voltage V, the CPU 331 determines that the voltage applied to the actual load 35 is excessively small. Accordingly, the CPU 331 increments the count OverC of the shutdown counter for permitting the intermediate module 12 to transition from an active mode to a sleep mode.

After incrementing the count OverC of the shutdown counter at step S106, the CPU 331 determines whether or not the count OverC has exceeded an upper limit Cmax1 (step S107). If the count OverC of the shutdown counter is determined to have exceeded the upper limit Cmax1 (Yes at step 107), the CPU 331 minimizes the output for PWM (step S108) and at the same time allows the intermediate module 12 to transition to a sleep mode (step S109).

In this way, when the duty ratio PWM_duty becomes equal to or more than the maximum value PWM_max and the voltage ADin reaches the upper limit Cmax1 after being continuously smaller than the threshold voltage V, the CPU 331 allows the intermediate module 12 to transition to a sleep mode.

For example, if, due to deviation of the position of the intermediate module 12, the electric power which is received by the power reception coil 31 of the intermediate module 12 from the power transmission module 11 is reduced, and this state continues for a predetermined period, the count OverC of the shutdown counter reaches the upper limit Cmax1. Thus, when the electric power received by the power reception coil 31 of the intermediate module 12 from the power transmission module 11 is drastically reduced, magnetic resonance will not be established. As a result, counter-electromotive force is generated in the electric circuit of the intermediate module 12.

There is a concern that the counter-electromotive force that has been generated in this way may break the elements configuring the electric circuit of the intermediate module 12. In this regard, when magnetic resonance is stopped due to, e.g., deviation of the position of the intermediate module 12, the CPU 331 allows the intermediate module 12 to transition to a sleep mode. This prevents breakage of the elements by the counter-electromotive force.

Figure 8:
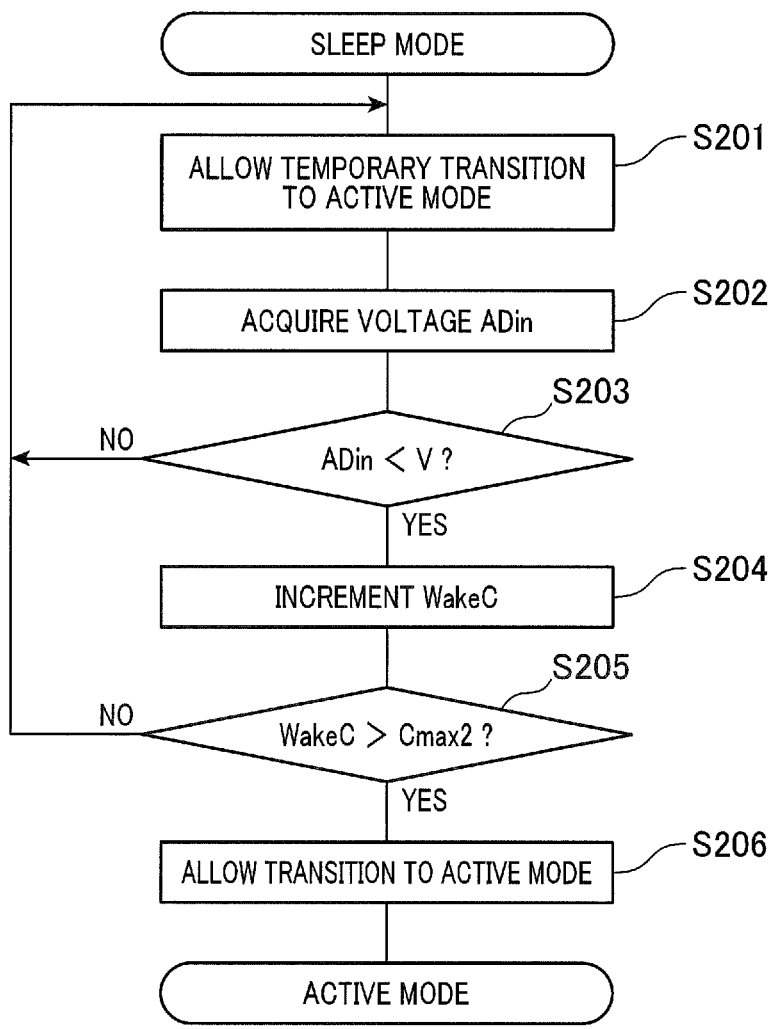
FIG. 8 is a schematic diagram showing a flow of return from a sleep mode to an active mode in the wireless power supply apparatus, according to the first embodiment.

On the other hand, when the intermediate module 12 is in a sleep mode, the CPU 331 determines whether to allow the intermediate module 12 to return from a sleep mode, in accordance with the flow shown in FIG. 8. Specifically, when the intermediate module 12 is in a sleep mode, the CPU 331 allows the intermediate module 12 to temporarily transition from a sleep mode to an active mode, at a predetermined time interval, using an interval timer preset in the CPU 331 (step S201).

In other words, after lapse of a preset period from when the intermediate module 12 has transitioned to a sleep mode, the CPU 331 periodically allows temporary transition of the intermediate module 12 from a sleep mode to an active mode. Thus, at step S108, the CPU 331 releases the setting of minimizing the output for PWM. Then, the CPU 331 acquires the voltage ADin from the AD input terminal 335 (step S202).

The CPU 331 determines whether the ADin acquired at step S202 is not less than the threshold voltage V (step S203). When the voltage ADin is determined to be not less than the threshold voltage V (Yes at step S203), the CPU 331 increments a count WakeC of a wakeup counter preset in the CPU 331 (step S204).

Specifically, if the voltage ADin is not less than the threshold voltage V, the CPU 331 determines that sufficient voltage is applied to the actual load 35. Accordingly, the CPU 331 increments the count WakeC of the wakeup counter for permitting the intermediate module 12 to transition from a sleep mode to an active mode.

After incrementing the count WakeC of the wakeup counter at step S204, the CPU 331 determines whether or not the count WakeC has exceeded an upper limit Cmax2 (step S205).

If the count WakeC of the wakeup counter is determined to have exceeded the upper limit Cmax2 (Yes at step S205), the CPU 331 allows the intermediate module 12 to transition to an active mode (step S206). In other words, if the count WakeC of the wakeup counter exceeds the upper limit Cmax2, the CPU 331 determines that the electric power supplied to the actual load 35 has been well recovered.

On the other hand, if the voltage ADin is determined to be smaller than the threshold voltage V (No at step S203) and the count WakeC is determined to be not more than the upper limit Cmax2 at step S205 (No at step S205), the CPU 331 allows the intermediate module 12 to remain in the sleep mode and control returns to step S201. In other words, under these conditions, the CPU 331 determines that the electric power supplied to the actual load 35 is insufficient and maintains the sleep mode to protect the electric circuit.

In this way, the CPU 331 of the intermediate module 12 switches the mode of the intermediate module 12 from an active mode to a sleep mode, or vice versa. Thus, based on whether the power reception coil 31 of the intermediate module 12 is relaying the electric power as a repeater, the elements configuring the intermediate module 12 are prevented from being broken.

In the first embodiment described above, the power reception coil 41 of the end module 13 functions as a power reception coil that receives electric power from the power transmission coil 21. Further, the power reception coil 31 of the intermediate module not only receives electric power from the power transmission coil 21 but also functions as a repeater.

The power reception coil 31 is connected with the actual load 35, while the power reception coil 41 is directly connected with the actual load 45. Specifically, the actual load 35 is powered by the electric power received by the power reception coil 31, while the actual load 45 is powered by the electric power received by the power reception coil 41.

Therefore, for example, a transformer that is a means for converting electric power is needed neither between the power reception coil 31 and the actual load 35, nor between the power reception coil 41 and the actual load 45. In other words, direct electrical connection is established between the power reception coil 31 and the actual load 35 and between the power reception coil 41 and the actual load 45 without interposing a power converting means, such as a transformer, in between.

Accordingly, there is no increase in the size of the intermediate module 12 including the power reception coil 31 and in the size of the end module 13 including the power reception coil 41. Further, in the first embodiment, since the power converting means is not necessary, energy decay is minimized and the electric power is ensured to be efficiently transferred without increasing the size of the machine.

In addition, in the first embodiment, the efficient power transfer contributes to reducing the electric capacities of the power supply unit 22 and the power transmission coil 21 on the power-transmission side. The reduction of the electric capacities can accelerate reduction of the size and facilitate introduction of the wireless power supply apparatus into robots and factory facilities.

In the first embodiment, the auxiliary load 36 is parallelly inserted between the power reception coil 31 and the actual load 35 in the intermediate module 12. Thus, in the event the power reception coil 31 and the actual load 35 are electrically disconnected to create an open state, the power reception coil 31 forms a closed circuit with the auxiliary load 36.

Therefore, the power reception coil 31 is ensured to steadily function as a repeater, irrespective of the activation conditions of the actual load 35. Accordingly, under the conditions where the power reception coil 31 and the actual load 35 are directly connected, the power transfer distance can be extended and steady power supply is ensured from the power transmission module 11 to the end module 13.

Second Embodiment

Figure 9:
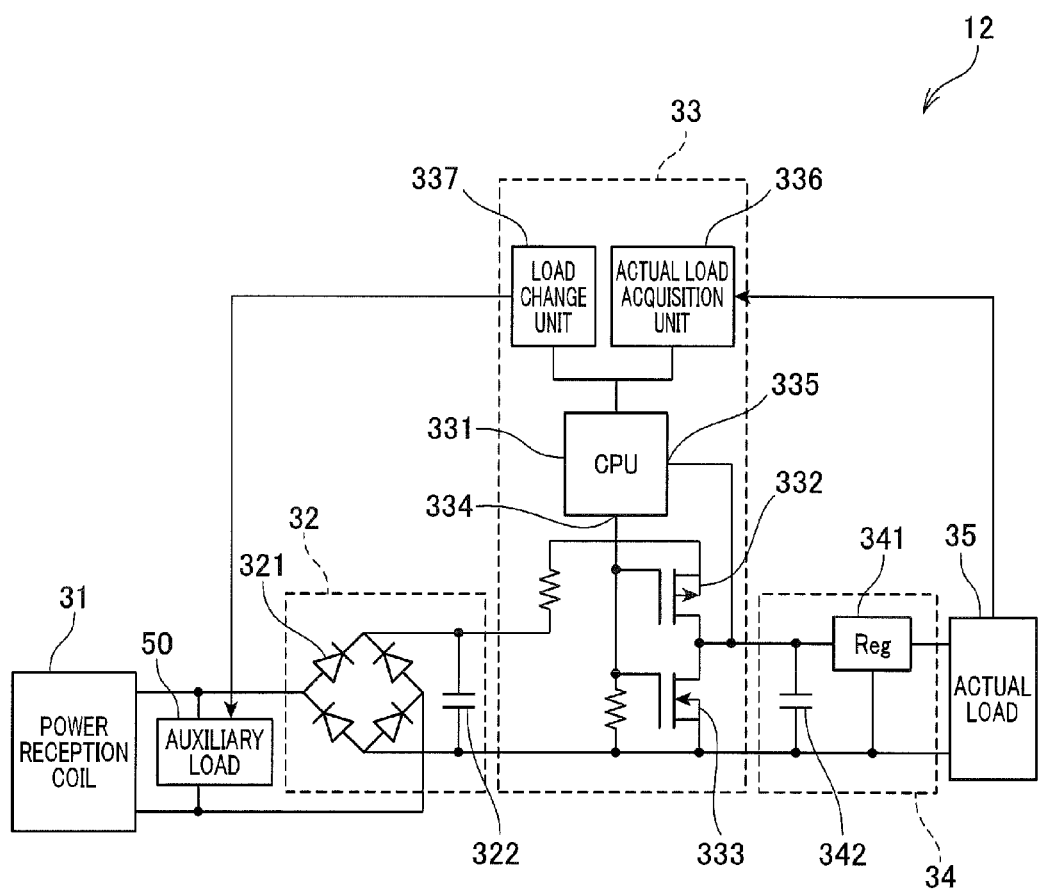
FIG. 9 is a schematic block diagram showing an intermediate module in a wireless power supply apparatus, according to a second embodiment of the present invention.

In a second embodiment, as shown in FIG. 9, the intermediate module 12 of the wireless power supply apparatus 10 includes an actual load acquisition unit (corresponding to actual load acquiring means) 336 and a load change unit (corresponding to load changing means) 337. Specifically, the CPU 331 of the intermediate module 12 executes a computer program to realize the actual load acquisition unit 336 and the load change unit 337 in software. The actual load acquisition unit 336 and the load change unit 337 may be realized in hardware as an electric circuit integrated into the CPU 331, or may be realized in the combination of hardware and software.

In the second embodiment, the intermediate module 12 includes an auxiliary load 50 that is a variable load whose magnitude is changeable. For example, the auxiliary load 50 is configured such as by a variable coil or a variable capacitor. The actual load acquisition unit 336 acquires, from the actual load 35 of the intermediate module 12, at least one of consumed power of the actual load 35, voltage applied to the actual load 35 and current passing through the actual load 35.

Thus, the actual load acquisition unit 336 acquires the magnitude of the load of the actual load 35 of the intermediate module 12. The load change unit 337 changes the load of the auxiliary load 50 on the basis of the load of the actual load 35 acquired by the actual load acquisition unit 336. In other words, the load change unit 337 changes the magnitude of the load of the auxiliary load 50 on the basis of the magnitude of the load of the actual load 35.

As described in the first embodiment, when the electric circuit including the power reception coil 31 is open due to the stoppage or the like of the actual load 35, the power reception coil 31 of the intermediate module 12 cannot function well as a repeater. Therefore, the auxiliary load 50 is inserted into the intermediate module 12 so that the electric circuit including the power reception coil 31 can function as a repeater.

On the other hand, as described above referring to FIG. 4, the electric power that can be received by the end module 13 varies, depending on the current passing through the power reception coil 31 of the intermediate module 12. When the actual load 35 is directly connected to the power reception coil 31 of the intermediate module 12, the current passing through the power reception coil 31 varies, depending on the magnitude of the load of the actual load 35.

Specifically, when power supply is performed by magnetic resonance, being relayed by the intermediate module 12 to which the actual load 35 is connected, the power supply efficiency between the power transmission coil 21 of the power transmission module 11 and the power reception coil 41 of the end module 13 varies, depending on the loaded state of the actual load 35 of the intermediate module 12. Therefore, it is favorable that the sum of the loads of the actual load 35 and the auxiliary load 50 of the intermediate module 12 is maintained to a value that can achieve high efficiency in transferring electric power from the power transmission module 11 to the end module 13.

In this regard, in the present embodiment, the actual load acquisition unit 336 acquires the load of the actual load 35 and the load change unit 336 changes the magnitude of the load of the auxiliary load 50 on the basis of the magnitude of the acquired load. Then, the load change unit 337 maintains a fixed value in the sum of the loads of the actual load 35 and the auxiliary load 50 of the intermediate module 12.

Thus, the current passing through the power reception coil 31 of the intermediate module 12 is maintained at a fixed level, irrespective of the variation in the load of the actual load 35. In this case, the load change unit 337 controls the current passing through the power reception coil 31 by changing the load of the auxiliary load 50. Thus, the current passing through the power reception coil 31 is controlled such that the efficiency of transferring electric power to the end module 13 is maintained at a fixed level or more.

As described above, in the second embodiment, the load change unit 337 constantly monitors the loaded state of the actual load 35. The load change unit 337 changes the load of the auxiliary load 50, in accordance with the acquired load of the actual load 35. Thus, power supply efficiency and steadiness in the power supply can be enhanced under the conditions where the load varies in the actual load 35 connected to the power reception coil 31 of the intermediate module 12. In addition, power supply efficiency can also be enhanced in the wireless power supply apparatus 10 as a whole.

The second embodiment has been described taking the auxiliary load 50 of the intermediate module 12 as an example. However, it may be so configured that an auxiliary load is provided to the end module 13 and the magnitude of the load of this auxiliary load is changed. In this way, the efficiency of receiving electric power in the end module 13 can be enhanced by changing the load of the auxiliary load in the end module 13.

Third Embodiment

Figure 10:
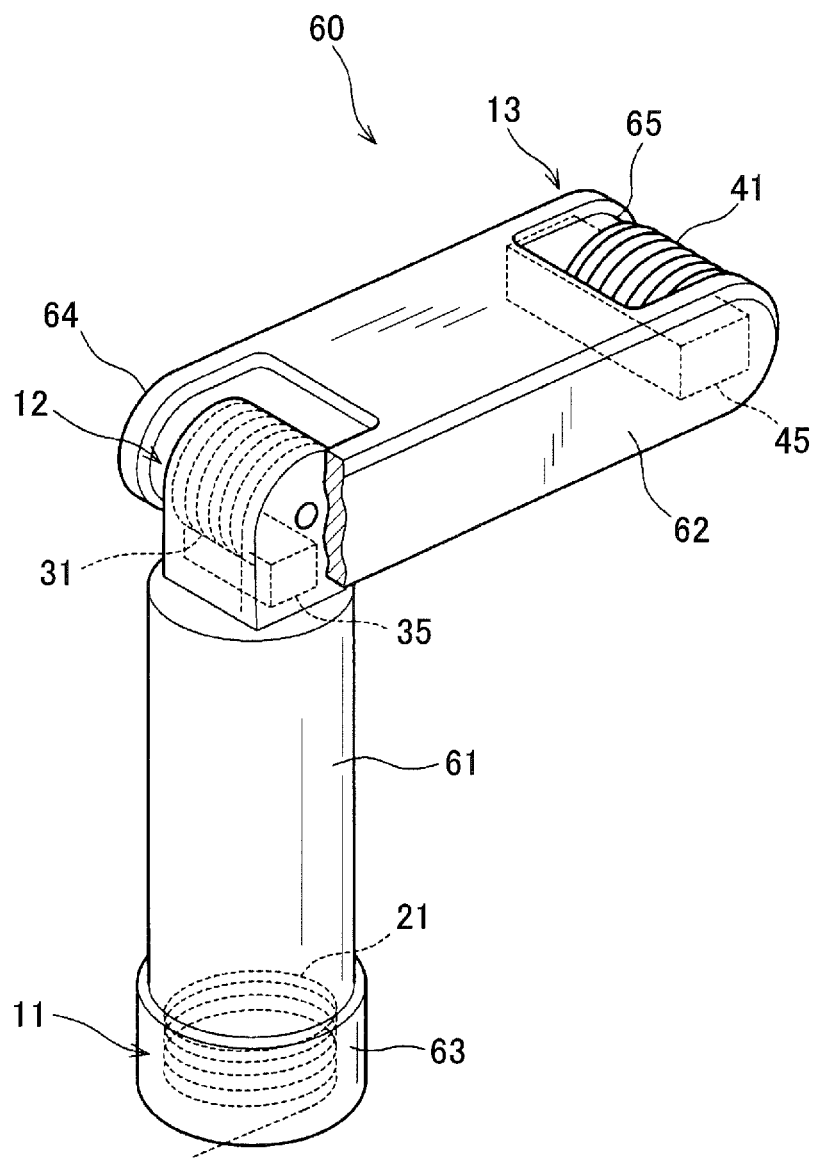
FIG. 10 is a schematic diagram showing a robot to which a wireless power supply apparatus is applied, according to a third embodiment of the present invention.

In a third embodiment, as shown in FIG. 10, the wireless power supply apparatus 10 of the embodiments described above is applied to an industrial articulated robot (hereinafter just referred to as "robot") 60.

The robot 60 has a plurality of arms which are rotatable about the respective axes. In FIG. 10, as a simplified example, the robot 60 includes a first arm 61, a second arm 62 and a seat base 63. The first arm 61 is provided to the seat base 63, which is fixed to the facility, so as to be relatively turned about the center axis, relative to the seat base 63. The first and second arms 61 and 62 are mutually turned about a joint 64 as a fulcrum. The second arm 62 has a functional part 65 at an end portion that is opposite to the first arm 61. The functional part 65 realizes various functions such as of a manipulator or a camera.

In the robot 60, the power transmission module 11 is provided to the seat base 63. The electric power outputted from the power transmission coil 21 of the power transmission module 11 is finally used as a motive power source by the functional part 65 provided at the end of the second arm 62. Therefore, the end module 13 is provided to the functional part 65 at the end of the second arm 62.

In the robot 60, the joint 64 is positioned at some point of a path extending from the seat base 63 to the functional part 65. Accordingly, it is difficult to directly transfer electric power from the power transmission module 11 provided to the seat base 63 to the functional part 65, without using a repeater.

Therefore, when the wireless power supply apparatus 10 is applied to the robot 60, the power reception coil 31 of the intermediate module 12 that functions as a repeater is provided to the joint 64. On the other hand, the joint 64 is provided so that the first and second arms 61 and 62 are mutually turned about the joint 64. A motor is used as a motive power of this turning.

The motor is actuated by the electric power received by the intermediate module 12. Specifically, the motor corresponds to the actual load 35 of the intermediate module 12 and is actuated by the electric power received by the power reception coil 31 of the intermediate module 12. The electric power outputted from the power transmission module 11 is partially consumed by the actual load 35, such as the motor, of the joint 64 and also used by the functional part 65 that corresponds to the actual load 45 of the end module 13.

In this case, it is not that the motor of the joint 64 is constantly actuated to consume electric power, but that the motor intermittently consumes electric power when the first and second arms 61 and 62 are rotated. In other words, the load of the motor that corresponds to the actual load 35 of the intermediate module 12 varies during the repetition of electrical connection and disconnection.

With the application of the wireless power supply apparatus 10 of the first or second embodiment, the functional part 65 connected to the end module 13 is able to steadily receive electric power, irrespective of the conditions of actuation of the motor connected to the intermediate module 12.

The wireless power supply apparatus 10 is directly connected with the actual loads 35 and 45. Therefore, the wireless power supply apparatus 10 has a reduced size and easily incorporated into the robot 60.

With the application of the wireless power supply apparatus 10, the robot 60 dispenses with cables or the like for supplying electric power from the seat base 63 to the joint 64 and from the joint 64 to the functional part 65. Omission of the cables leads to the elimination of the necessity of using the cables and members for protecting the cables, as well as the elimination of the space for housing these cables and members. In addition, components of the robot are prevented from being in contact with the cables during the turning of the parts, and noise and damage that would be caused by the contact are eliminated. As a result, the configuration of the robot 60 is simplified, noise is minimized and the life of the robot 60 is extended.

The present invention described so far is not limited to the above embodiments but may be applied to various embodiments within a scope not departing from the spirit of the invention.

In the first to third embodiments described above, a single intermediate module 12 is inserted between the power transmission module 11 and the end module 13. However, the number of the intermediate modules 12 to be inserted is not limited to one, but may be two or more. For example, when the wireless power supply apparatus 10 is applied to a six-axis articulated robot, three or more intermediate modules 12 may be inserted into the apparatus and electric power may be ensured to be transferred from the power transmission module 11 provided to the seat base 63 to the functional part 65 provided at an end.

Fourth Embodiment

Referring to the drawings, hereinafter is described a fourth embodiment which is applied to a filter unit and a power supply apparatus for a robot using the filter unit. In the present embodiment, the components substantially identical with each other are given the same reference numerals for the sake of omitting unnecessary explanation.
(Filter Unit)

Figure 11:
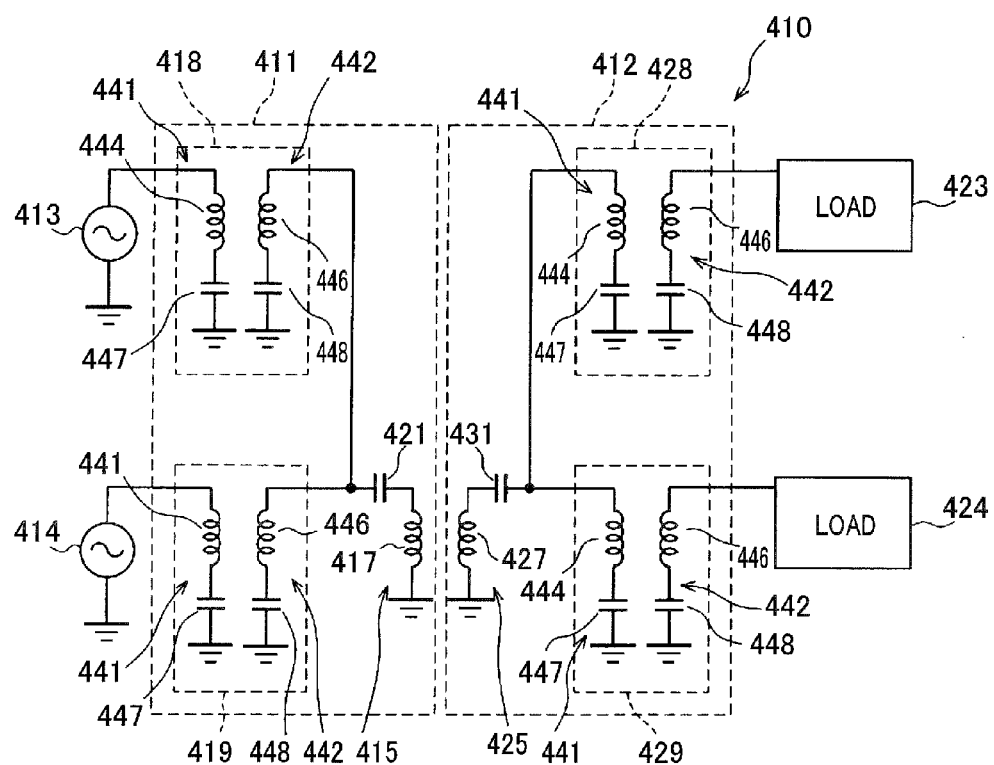
FIG. 11 is a schematic diagram showing an electric circuit of a power supply apparatus to which a filter unit is applied, according to a fourth embodiment of the present invention.

First, referring to FIG. 11, an embodiment of a filter unit is described.

FIG. 11 shows an example of an electric circuit of a power supply apparatus 410 to which the filter unit according to the embodiment is applied.

The power supply apparatus 410 includes a power-source side power transmission unit 411 and a load side power reception unit 412. The power transmission unit 411 is connected to a power source 413 and a power source 414 having a frequency different from each other.

The power transmission unit 411 receives supply of electric power from these power sources 413 and 414. In the present embodiment, the power source 413 is a 2-MHz high-frequency power source and the power source 414 is a 5-MHz high-frequency power source. The power transmission unit 411 includes a power transmission coil unit 415.

Figure 12:
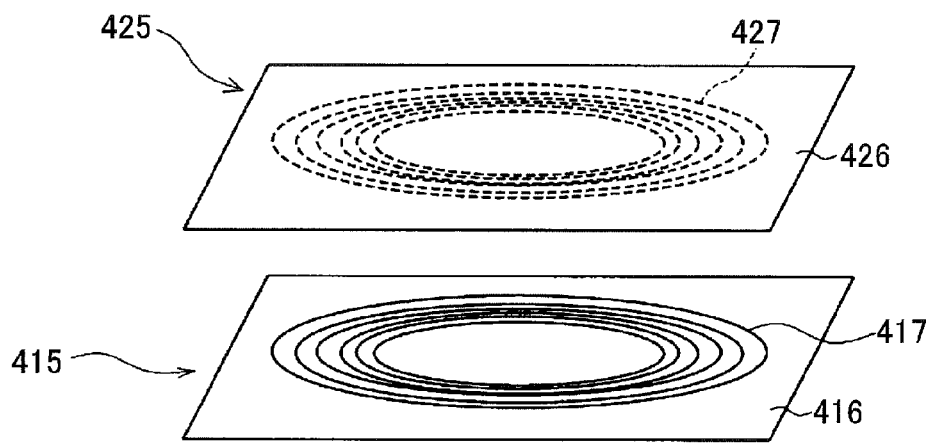
FIG. 12 is a schematic diagram showing a power transmission coil unit and a power reception coil unit of a power supply apparatus to which the filter unit is applied, according to the fourth embodiment.

As shown in FIG. 12, the power transmission coil unit 415 includes a planar base 416 which is provided with a planar coil 417. For example, the coil 417 is planarly formed such as of a copper wire, a copper sheet or a printed wiring of copper.

As shown in FIG. 11, the power transmission unit 411 includes a filter unit 418 and a filter unit 419 corresponding to the power source 413 and the power source 414, respectively. Specifically, the filter unit 418 is connected between the power source 413 and the power transmission coil unit 415. The filter unit 419 is connected between the power source 414 and the power transmission coil unit 415. A capacitor 421 is inserted between the power transmission coil unit 415 and the filter units 418 and 419. Thus, a resonant circuit is configured by the coil 417 of the power transmission coil unit 415 and the capacitor 421.

The power reception unit 412 is connected to a load 423 and a load 424 that are powered at different frequencies. In the present embodiment, the load 423 is powered at a frequency of 2 MHz corresponding to the 2-MHz power source of 413. The load 424 is powered at a frequency of 5 MHz corresponding to the 5-MHz power source 414. The power reception unit 412 includes a power reception coil unit 425.

As shown in FIG. 12, the power reception coil unit 425 includes a planar base 426 which is provided with a planar coil 427, similar to the power transmission coil unit 415. The power transmission coil unit 415 of the power transmission unit 411 faces the power reception coil unit 425 of the power reception unit 412 in a non-contact manner. The coil 417 provided to the base 416 of the power transmission coil unit 415 and the coil 427 provided to the base 426 of the power reception coil unit 425 are opposed to each other.

The high-frequency electric powers supplied from the power sources 413 and 414 of the power transmission unit 411 are transferred to the loads 423 and 424, respectively, connected to the power reception unit 412, in a non-contact manner via the magnetic power resonance occurring between the power transmission coil unit 415 and the power reception coil unit 425.

As shown in FIG. 11, the power reception unit 412 includes a filter unit 428 and a filter unit 429 corresponding to the loads 423 and 424, respectively. Specifically, the filter unit 428 is connected between the power reception coil unit 425 and the load 423. The filter unit 429 is connected between the power reception coil unit 425 and the load 424. A capacitor 431 is inserted between the power reception coil unit 425 and the filter units 428 and 429. Thus, a resonant circuit is configured by the coil 427 of the power reception coil unit 425 and the capacitor 431.

As described above, electric power is transferred from the power transmission coil unit 415 of the power transmission unit 411 to the power reception coil unit 425 of the power reception unit 412, in a non-contact manner via magnetic resonance. As shown in FIG. 12, the power transmission coil unit 415 and the power reception coil unit 425 are opposed to each other forming in between a gap of several centimeters to several dozen centimeters (between ten and twenty centimeters). Accordingly, with an application of a high-frequency wave to the power transmission coil unit 415, magnetic resonance occurs between the power transmission coil unit 415 and the power reception coil unit 425 to transfer electric power from the power transmission coil unit 415 to the power reception coil unit 425.

Figure 13:
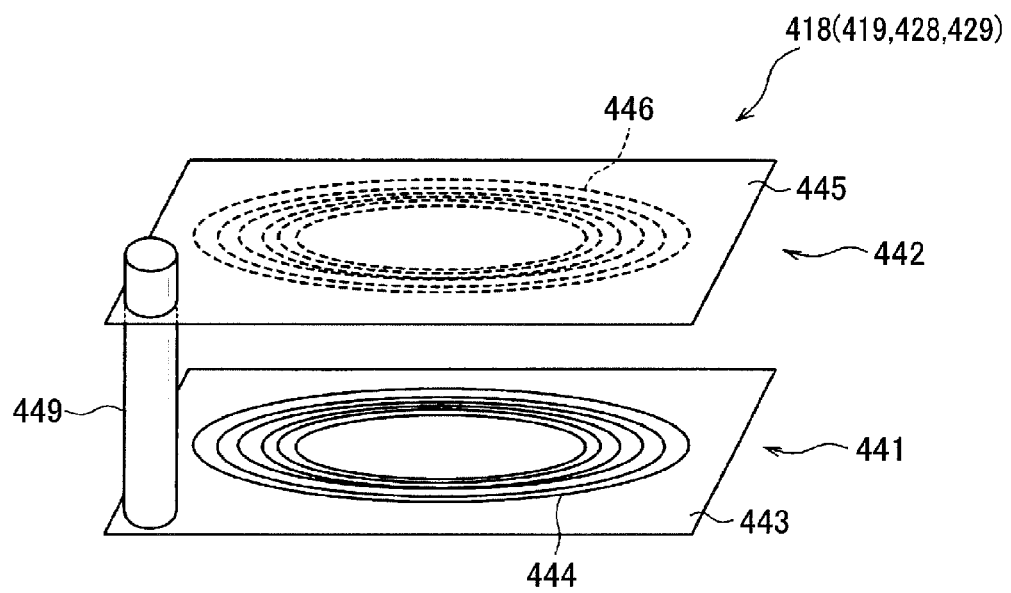
FIG. 13 is a schematic diagram showing the filter unit, according to the fourth embodiment.

Hereinafter are described the filter units 418, 419, 428 and 429. The filter units 418, 419, 428 and 429 have substantially an identical configuration. Referring to FIG. 13, the configuration of these filter units is described, taking the filter unit 418 as an example.

The filter unit 418 includes a first coil segment 441 and a second coil segment 442. The first coil segment 441 is connected to a power-supply side. The second coil segment 442 is connected to a power-consumption side.

The first coil segment 441 includes a planar base 443 and a planar coil 444. Similarly, the second coil segment 442 includes a planar base 445 and a planar coil 446. Similar to the power transmission coil unit 415 and the power reception coil unit 425, the coils 444 and 446 of the first and second coil segments 441 and 442, respectively, are each planarly formed such as of a copper wire, a copper sheet or a printed wiring of copper.

As shown in FIG. 11, the coil 444 of the first coil segment 441 is grounded, being interposed by a capacitor 447. Thus, the coil 444 of the first coil segment 441 and the capacitor 447 configure a resonant circuit. The coil 446 of the second coil segment 442 is grounded, being interposed by a capacitor 448. Thus, the coil 446 of the second coil segment 442 and the capacitor 448 configure a resonant circuit.

As shown in FIG. 13, the first and second coil segments 441 and 442 are opposed to each other with a gap of several centimeters to several dozen centimeters (between ten and twenty centimeters) being formed therebetween. The coil 444 provided to the base 443 of the first coil segment 441 and the coil 446 provided to the base 445 of the second coil segment 442 are opposed to each other. A spacer 449 is provided between the first and second coil segments 441 and 442. The spacer 449 defines the distance between the first and second segment coils 441 and 442.

A high-frequency wave of several MHz to several tens of MHz is applied to the first coil segment 441 from the power-supply side, such as the power sources 413 and 414 and the power reception coil unit 425. Accordingly, similar to the power transmission coil unit 415 and the power reception coil unit 425, magnetic resonance occurs between the first and second coil segments 441 and 442. The magnetic resonance occurs only in a specific frequency band by resonance characteristics of the first and second coil segments 441 and 442.

Specifically, when the magnetic resonance of the first and second coil segments 441 and 442 is used, only a specific frequency is permitted to pass through the filter units 418, 419, 428 and 429. Further, use of the magnetic resonance can prevent emission of electromagnetic waves that would induce noises. The bandwidth and the frequency of the high-frequency wave transferred from the first coil segment 441 to the second coil segment 442 vary, depending such as on the distance between the first and second coil segments 441 and 442 that are opposed to each other and the resonant frequencies of the magnetic resonance that occurs between the first and second coil segments 441 and 442.

Therefore, the frequency and the bandwidth of the signal transferred from the first coil segment 441 to the second coil segment 442 can be easily changed by changing the distance between the first and second coil segments 441 and 442 and the resonant frequencies in the magnetic resonance that occurs between the first and second coil segments 441 and 442. For example, the resonant frequencies between the first and second coil segments 441 and 442 can be easily changed by changing the number of turns of the coil 444 or 446 of the first or second coil segment 441 or 442, the capacity of the capacitor 447 or 448, or the like.

In the power supply apparatus 410 shown in FIG. 11, the first coil segment 441 of the filter unit 418 is connected to the power source 413 on the power-supply side, while the first coil segment 441 of the filter unit 419 is connected to the power source 414. In the filter units 418 and 419, the power-consumption side is the coil 417 of the power transmission coil unit 415. Accordingly, the second coil segments 442 of the filter units 418 and 419 are both connected to the coil 417 of the power transmission coil unit 415.

On the other hand, the first coil segments 441 of the filter units 428 and 429 are both connected to the coil 427 of the power reception coil unit 425 that is on the power-supply side. The second coil segment 442 of the filter unit 428 is connected to the load 423 that is on the power-consumption side, while the second coil segment 442 of the filter unit 429 is connected to the load 424.

Hereinafter, characteristics of the filter units 418, 419, 428 and 429 will be described.

Figure 14:
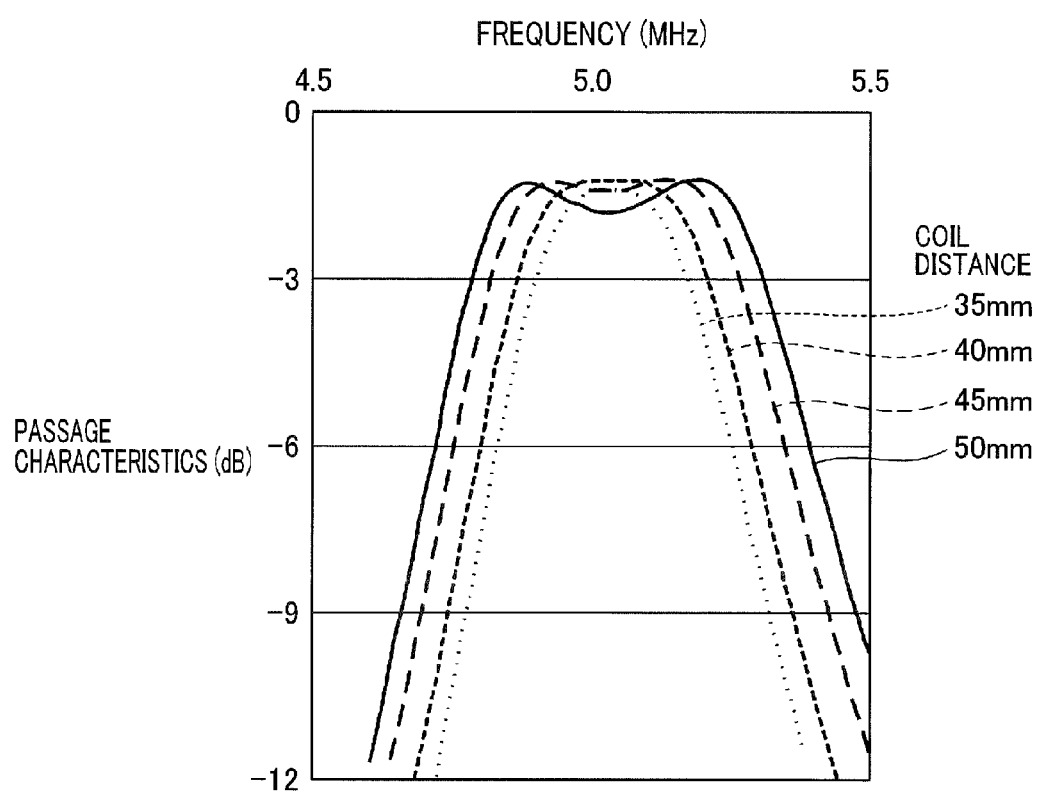
FIG. 14 is a schematic diagram showing a relationship between frequencies and passage characteristics of the filter unit, according to the fourth embodiment.
Figure 15:
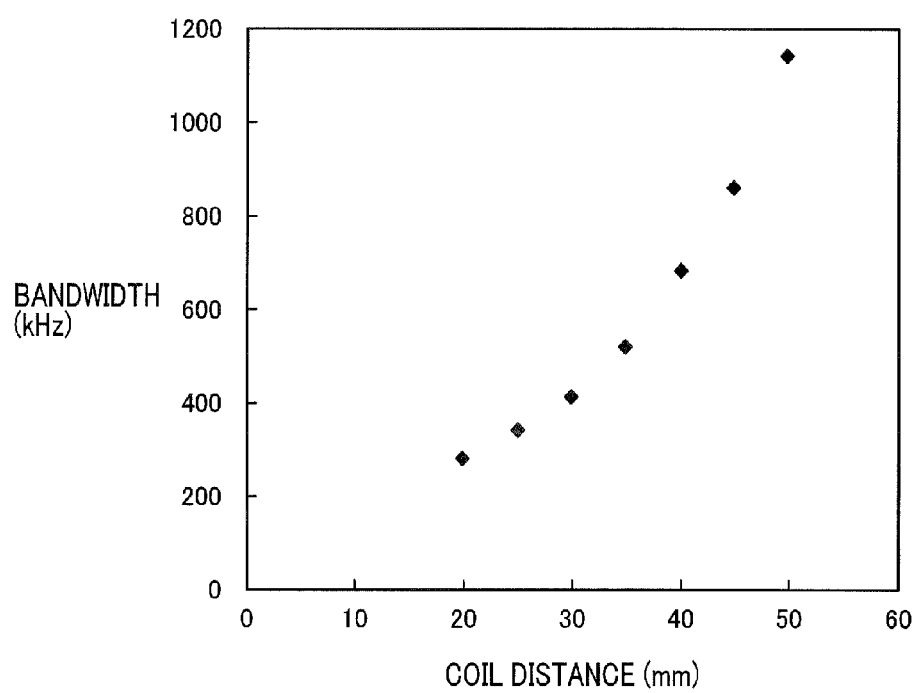
FIG. 15 is a schematic diagram showing a relationship of distance between first and second coil segments, to bandwidth in the filter unit, according to the fourth embodiment.

First, characteristics of these filters are described, taking the filter unit 419 as an example, which is connected to the 5-MHz power source 414. As shown in FIGS. 14 and 15, change of the distance between the opposed first and second coil segments 441 and 442 can change the passage characteristics and the bandwidth of the high-frequency wave transferred by magnetic resonance.

FIG. 14 shows distance [mm] between the first and second coil segments 441 and 442, relative to passage characteristics [dB]. FIG. 15 shows distance [mm] between the first and second coil segments 441 and 442, relative to bandwidth [kMz]. As can be seen from FIGS. 14 and 15, as the distance between the first and second coil segments 441 and 442 becomes smaller, the frequency band of the high-frequency wave that passes via magnetic resonance tends to become steeper.

The similar characteristics can be seen in the filter unit 429 connected to the 5-MHz load 424. Also, the similar characteristics, excepting those of the frequency of the high-frequency wave that passes via magnetic resonance, can be seen in the filter units 418 and 428 connected to the 2-MHz power source 413.

Figure 16:
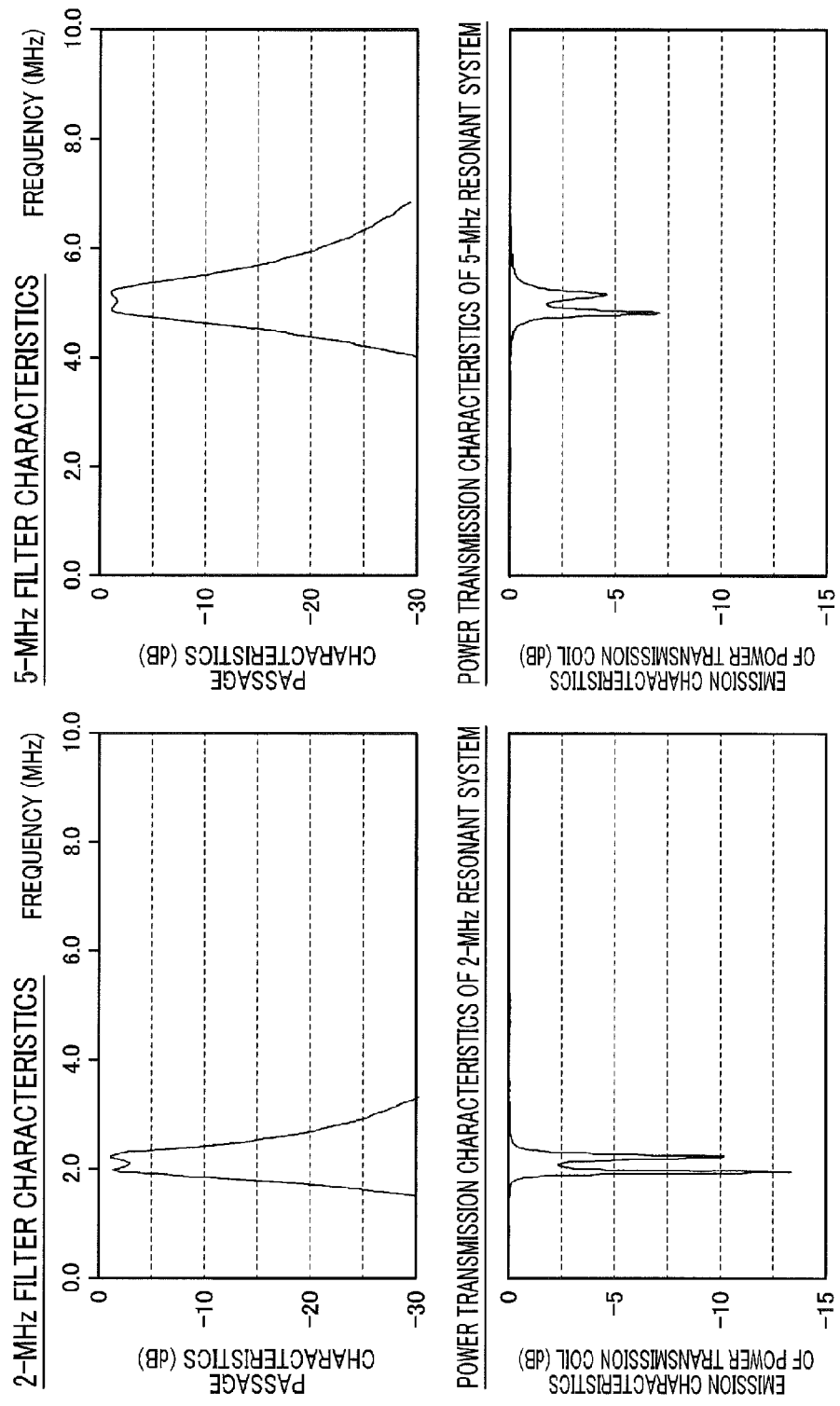
FIG. 16 is a schematic diagram showing characteristics of each frequency in the filter unit, according to the fourth embodiment.

FIG. 16 shows frequency-specific characteristics of the filter units 418, 419, 428 and 429, i.e. filter characteristics (passage characteristics [dB] relative to frequency [MHz]) and power transmission characteristics of resonant system (power transmission coil emission characteristics [dB] relative to frequency [MHz]). In FIG. 16, the left side shows the characteristics of the 2-MHz filters 418 and 428 (upper stage: 2-MHz filter characteristics, lower stage: power transmission coil emission characteristics of 2-MHz resonant system). In FIG. 16, the right side shows the characteristics of the 5-MHz filters 419 and 429 (upper stage: 5-MHz filter characteristics, lower stage: power transmission coil emission characteristics of 5-MHz resonant system).

As shown in FIG. 11, these filter units 418, 419, 428 and 429 can be used to transfer electric powers having frequencies of 5 MHz and 2 MHz from the power transmission unit 411 to the power reception unit 412. Specifically, use of these filter units 418, 419, 428 and 429 enables transmission of 5-HMz and 2-HMz high-frequency waves being superimposed with each other, between the power transmission unit 411 and the power reception unit 412.

In the transmission unit 411, the filter unit 418 is inserted between the power source 413 and the power transmission coil unit 415, and the filter unit 419 is inserted between the power source 414 and power transmission coil unit 415.

While allowing passage of the 2-MHz high-frequency wave, the filter unit 418 blocks passage of the 5-MHz high-frequency wave (refer to the characteristics shown on the left side of FIG. 16). Therefore, the 5-MHz high-frequency wave from the power source 414 is prevented from being propagated to the 2-MHz power source 413 side by the filter unit 418.

Similarly, while allowing passage of 5-MHz high-frequency wave, the filter unit 419 blocks passage of the 2-MHz high-frequency wave (refer to the characteristics shown on the right side of FIG. 16). Therefore, the 2-MHz high-frequency wave from the power source 413 is prevented from being propagated to the 5-MHz power source 414 side by the filter unit 419.

Accordingly, interference can be avoided on the side of the power transmission unit 411, in the case of superimposing the high-frequency waves of different frequencies from the power supplies 413 and 414.

On the other hand, in the power reception unit 412, the filter unit 428 is inserted between the power reception coil unit 425 and the load 423, and the filter unit 429 is inserted between the power reception coil unit 425 and the load 424.

While allowing passage of the 2-MHz high-frequency wave, the filter unit 428 blocks passage of the 5-MHz high-frequency wave (refer to the characteristics shown on the left side of FIG. 16). Therefore, the 5-MHz high-frequency wave included and superimposed in the high-frequency waves received by the power reception coil unit 425 is prevented from being propagating to the load 423 side by the filter unit 428.

Similarly, while allowing passage of the 5-MHz high-frequency wave, the filter unit 429 blocks passage of the 2-MHz high-frequency wave (refer to the characteristics shown on the right side of FIG. 16). Therefore, the 2-MHz high-frequency wave included and superimposed in the high-frequency waves received by the power reception coil unit 425 is prevented from being propagating to the load 424 side by the filter unit 429.

Accordingly, on the power reception unit 412 side, the superimposed high-frequency waves of different frequencies can be separated by the filter units 428 and 429.

In the embodiment of the power supply apparatus 410 described above, the power-supply side first coil segment 441 and the power-consumption side second coil segment 442 are opposed to each other in a non-contact manner. Thus, magnetic resonance occurs between the first and second coil segments 441 and 442.

With the application of a predetermined high-frequency wave to the first coil segment 441, the impedance of the second coil segment 442 is lowered by the magnetic resonance, and high-frequency electric power is transferred from the first coil segment 441 to the second coil segment 442 in a non-contact manner.

Magnetic resonance occurs at a specific frequency between the pair of the first and second coil segments 441 and 442. Specifically, in the present embodiment, magnetic resonance occurs at 2 MHz in the filter units 418 and 428, and magnetic resonance occurs at 5 MHz in the filter units 419 and 429. Thus, the first and second coil segments 441 and 442 make use of the magnetic resonance occurring therebetween to function as filters that allow passage of only a specific frequency.

Use of the magnetic resonance can prevent emission of electromagnetic waves that would induce noises. Further, the frequency and the bandwidth of the high-frequency wave transferred from the first coil segment 441 to the second coil segment 442 vary, depending on the distance and the resonant frequencies between the first and second coil segments 441 and 442 that are opposed to each other.

Therefore, the frequency and the bandwidth of the signal transferred from the first coil segment 441 to the second coil segment 442 can be easily changed by changing the distance between the first and second coil segments 441 and 442 and the resonant frequencies in the magnetic resonance that occurs therebetween. Thus, characteristics of the filters can be easily adjusted without causing emission of electromagnetic waves.

(Application to a Power Supply Apparatus for Robots)

Figure 17:
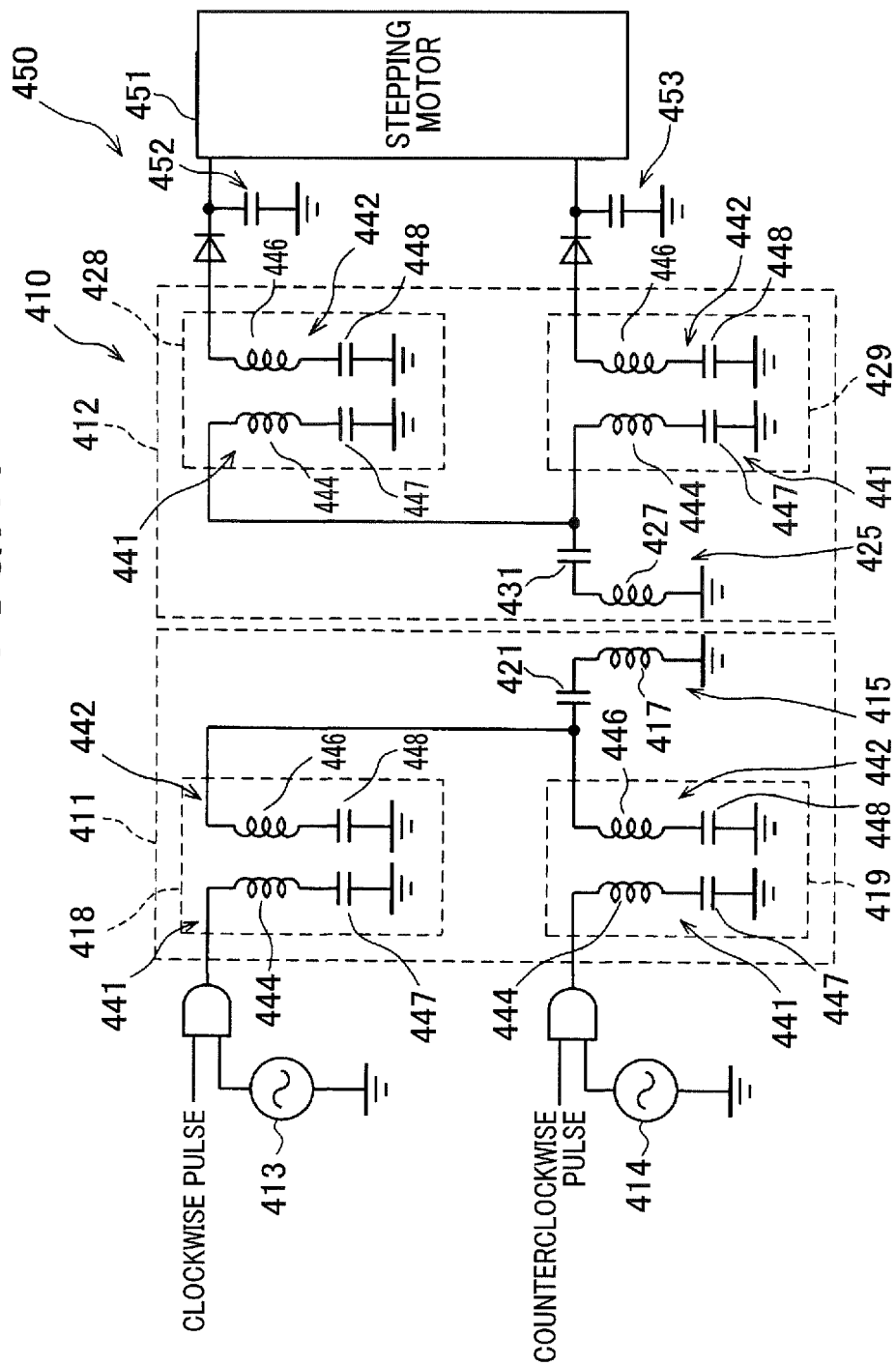
FIG. 17 is a schematic diagram showing an electric circuit of a power supply apparatus for a robot to which the filter unit is applied, according to the fourth embodiment.

Referring now to FIG. 17, hereinafter is described an example of an application of the power supply apparatus 410 to a robot 450.

In the present embodiment, the robot 450 includes a stepping motor 451 as a load. The power supply apparatus 410 is used for modulating clockwise pulses and counterclockwise pulses serving as control signals for the stepping motor 451. Clockwise pulses for clockwise rotation are modulated and outputted from the 2-MHz power source 413. Also, counterclockwise pulses for counterclockwise rotation are modulated and outputted from the 5-MHz power source 414. The stepping motor 451 corresponds to the loads 423 and 424.

In the application to the robot 450 as well, the electrical configuration of the power supply apparatus 410 is substantially the same as the electrical configuration shown in FIG. 11. In the power reception unit 412, rectifier circuits 452 and 453 may be provided on the stepping motor 451 side of the filter units 428 and 429, respectively. In the robot 450 using the power supply apparatus 410, clockwise pulses are extracted from the filter unit 428 side of the power reception unit 412. Also, counterclockwise pulses are extracted from the filter unit 429 side of the power reception unit 412.

In the application of the power supply apparatus 410 to the robot 450, the robot 450 includes the filter units 418, 419, 428 and 429 described above. The power supply apparatus 410 of the robot 450 uses magnetic resonance to transfer electric power from the power transmission unit 411 to the power reception unit 412. Therefore, between the power transmission unit 411 and the power reception units 412, emission of electromagnetic waves is reduced, which is the cause of noises.

The power transmission unit 411 and the power reception unit 412 have power transfer paths which are each provided with the filter units 418, 419, 428 and 429. Accordingly, on the power reception unit 412 side, the control signals composed of a plurality of frequencies are separated by the filter units 428 and 429.

On the other hand, on the power transmission unit 411 side, the filter units 418 and 419 can reduce the interference between the control signals composed of a plurality of frequencies. In this way, under the conditions where the power transmission unit 411 and the power reception unit 412 are wirelessly connected and signals having different frequencies are superimposed with each other, emission of electromagnetic waves is reduced and control signals are steadily transferred.

The invention described so far is not limited to the embodiment described above, but may be applied to various embodiments within a scope not departing from the spirit of the present invention.

For example, the robot 450 may be configured as a linear-motion robot in which a movable member that includes the power reception unit 412 moves along the fixed power transmission unit 411 having the shape of a rail or the like.

What is claimed is:

1. A wireless power supply apparatus comprising:
   a power transmission coil to which electric power is supplied from a power supply unit;
   a power reception coil that functions as a repeater configured to (i) receive electric power in a non-contact manner by magnetic resonance with the power transmission coil and (ii) relay transfer of the electric power from the power transmission coil;
   an actual load connected to the power reception coil and powered by the electric power received by the power reception coil; and
   an auxiliary load inserted parallel to the power reception coil and the actual load and configured to form a closed circuit with the power reception coil when supply of the electric power to the actual load is interrupted to be in an open state, so as to ensure the repeater function of the power reception coil irrespective of activation conditions of the actual load.

2. The wireless power supply apparatus according to claim 1, further comprising:
   an actual load acquiring unit configured to acquire load of the actual load; and
   a load changing unit configured to change load of the auxiliary load in accordance with the load of the actual load acquired by the actual load acquiring unit.

3. The wireless power supply apparatus according to claim 1, further comprising:
   a power transmission module that includes the power supply unit and the power transmission coil, and is configured to wirelessly supply electric power from the power supply unit via the power transmission coil;
   an end module configured to wirelessly receive the electric power supplied from the power transmission module; and
   an intermediate module configured to wirelessly relay transfer of the electric power between the power transmission module and the end module, the intermediate module including the power reception coil, the actual load and the auxiliary load.

4. The wireless power supply apparatus according to claim 3, wherein the power transmission module, the intermediate module and the end module are provided in a robot.

5. The wireless power supply apparatus according to claim 4, wherein the robot is an articulated robot.

\* \* \* \* \*